United States Patent
Akuzawa

(10) Patent No.: US 10,432,804 B2
(45) Date of Patent: Oct. 1, 2019

(54) DISPLAY CONTROL FOR AN IMAGE PROCESSING APPARATUS

(71) Applicant: CANON KABUSHIKI KAISHA, Tokyo (JP)

(72) Inventor: Masao Akuzawa, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/880,424

(22) Filed: Jan. 25, 2018

(65) Prior Publication Data

US 2018/0220015 A1   Aug. 2, 2018

(30) Foreign Application Priority Data

Jan. 31, 2017   (JP) .................. 2017-016095

(51) Int. Cl.
*G06F 3/12* (2006.01)
*H04N 1/00* (2006.01)
*H04N 1/21* (2006.01)

(52) U.S. Cl.
CPC ..... *H04N 1/00389* (2013.01); *H04N 1/00395* (2013.01); *H04N 1/00411* (2013.01); *H04N 1/00474* (2013.01); *H04N 1/00482* (2013.01); *H04N 1/00506* (2013.01); *H04N 1/00517* (2013.01); *H04N 1/21* (2013.01); *H04N 2201/0094* (2013.01)

(58) Field of Classification Search
None
See application file for complete search history.

(56) References Cited

U.S. PATENT DOCUMENTS

| 2010/0157362 | A1* | 6/2010 | Oomura ................ G06F 3/1204 358/1.15 |
| 2013/0050731 | A1 | 2/2013 | Fukuoh |
| 2015/0222770 | A1* | 8/2015 | Yoshida ............. H04N 1/00517 358/1.15 |

FOREIGN PATENT DOCUMENTS

| CN | 102377897 A | 3/2012 |
| CN | 103631543 A | 3/2014 |
| CN | 104601841 A | 5/2015 |
| CN | 105430244 A | 3/2016 |
| JP | 2015-146503 A | 8/2015 |

* cited by examiner

*Primary Examiner* — Henok Shiferaw
(74) *Attorney, Agent, or Firm* — Canon U.S.A., Inc., IP Division

(57) ABSTRACT

An image processing apparatus, in response to selection of a setting history of a job, receives an instruction to register a job setting corresponding to the selected setting history as a frequently used setting.

17 Claims, 26 Drawing Sheets

FIG. 8A  800

| TYPE | NUMBER OF COPY | COLOR SELECTION | SHEET SELECTION | PAGE AGGREGATION | TWO-SIDED | SPREAD → TWO PAGES | MAGNIFICATION | etc... |
|---|---|---|---|---|---|---|---|---|
| DEFAULT SETTING | 1 COPY | MONOCHROME | AUTO | 1 in 1 | ONE-SIDED | OFF | 100% | ... |
| CURRENT SETTING | 2 COPY | COLOR | AUTO | 1 in 1 | TWO-SIDED | OFF | 100% | ... |

| TYPE | NUMBER OF COPY | COLOR SELECTION | SHEET SELECTION | PAGE AGGREGATION | TWO-SIDED | SPREAD → TWO PAGES | MAGNIFICATION | etc... |
|---|---|---|---|---|---|---|---|---|
| DEFAULT SETTING | 1 COPY | MONOCHROME | AUTO | 1 in 1 | ONE-SIDED | OFF | 100% | ... |
| CURRENT SETTING | 5 COPY | COLOR | AUTO | 1 in 1 | TWO-SIDED | OFF | 100% | ... |

| TYPE | ADDRESS | NUMBER OF ADDRESSES | TWO-SIDED DOCUMENT | READ SIZE | SIZE MIXED DOCUMENT | FILE FORMAT | COLOR SELECTION | RESOLUTION | etc... |
|---|---|---|---|---|---|---|---|---|---|
| DEFAULT SETTING | — | — | — | — | — | PDF | AUTO (COLOR/ MONOCHROME) | 600 dpi | ... |
| CURRENT SETTING | inoue@xxxxxxxx.co.jp | 1 | — | A4 | — | PDF | AUTO (COLOR/GRAY) | 300 dpi | ... |

1401 / 1402 / 1403

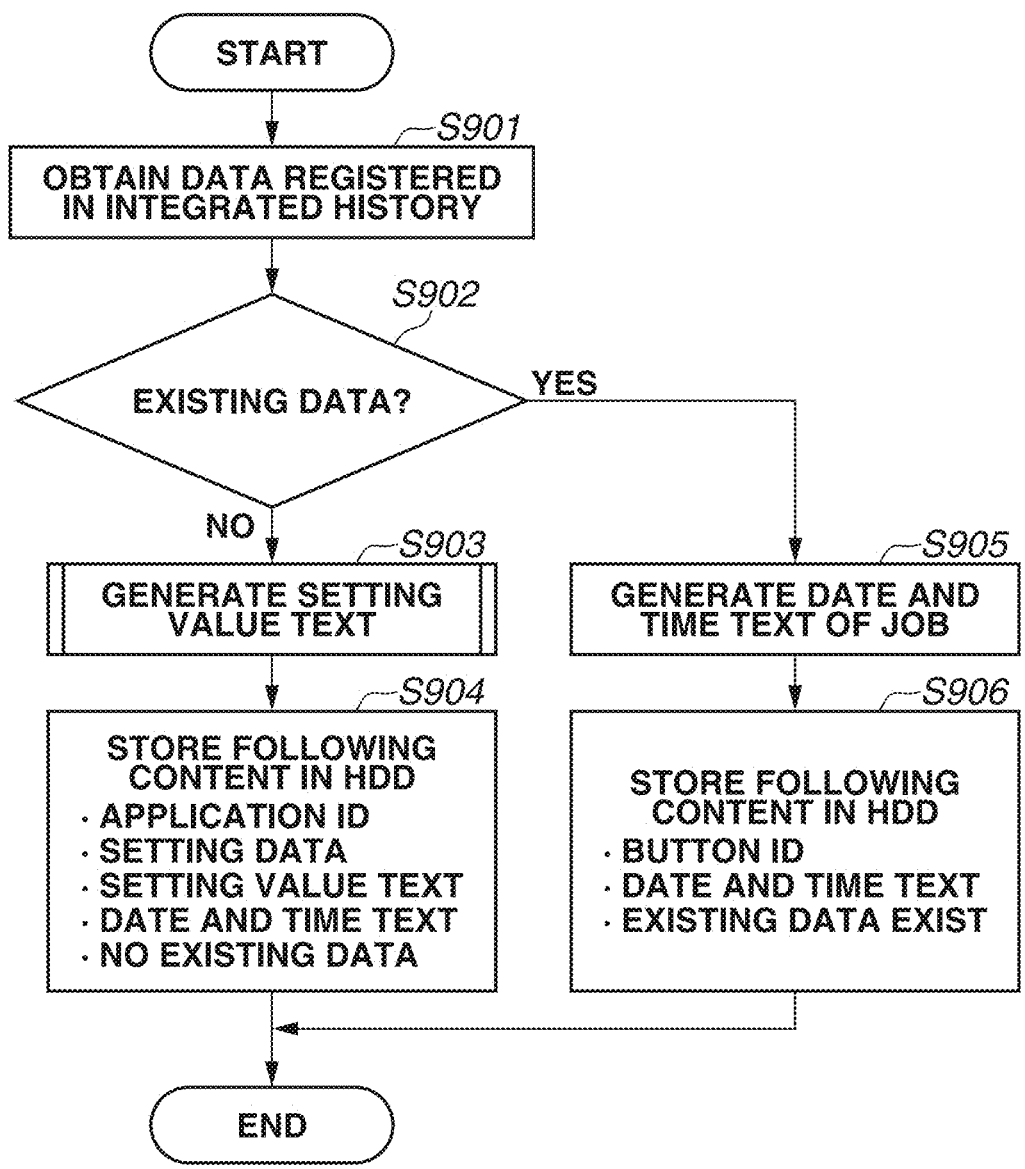

| BUTTON ID | APPLICATION ID | DATA | DISPLAYED TEXT | |
|---|---|---|---|---|
| | | | DATE AND TIME | SETTING VALUE |
| | | | | |
| | | | | |
| | | | | |
| | | | | |
| | | | | |
| | | | | |

FIG.10B

| BUTTON ID | APPLICATION ID | DATA | DISPLAYED TEXT | |
|---|---|---|---|---|
| | | | DATE AND TIME | SETTING VALUE |
| 1001 | 101 | data1.xml | 2016/12/15 13:01:22 | 2 COPIES, COLOR, TWO-SIDED |
| | | | | |
| | | | | |
| | | | | |
| | | | | |
| | | | | |

FIG.10C

| BUTTON ID | APPLICATION ID | DATA | DISPLAYED TEXT | |
|---|---|---|---|---|
| | | | DATE AND TIME | SETTING VALUE |
| 1001 | 101 | data1.xml | 2016/12/15 13:01:22 | 2 COPIES, COLOR, TWO-SIDED |
| 1002 | 101 | data2.xml | 2016/12/16 15:38:16 | 5 COPIES, COLOR, TWO-SIDED |
| | | | | |
| | | | | |
| | | | | |
| | | | | |

FIG.10D

| BUTTON ID | APPLICATION ID | DATA | DISPLAYED TEXT | |
|---|---|---|---|---|
| | | | DATE AND TIME | SETTING VALUE |
| 1001 | 101 | data1.xml | 2016/12/15 13:01:22 | 2 COPIES, COLOR, TWO-SIDED |
| 1002 | 101 | data2.xml | 2016/12/16 15:38:16 | 5 COPIES, COLOR, TWO-SIDED |
| 1003 | 201 | data3.xml | 2016/12/17 08:25:43 | inoue@xxxxxxxxx.co.jp, 1 CASE, A4, AUTO (COLOR/GRAY) |
| | | | | |
| | | | | |
| | | | | |
| | | | | |

FIG.10E

| BUTTON ID | APPLICATION ID | DATA | DISPLAYED TEXT | |
|---|---|---|---|---|
| | | | DATE AND TIME | SETTING VALUE |
| 1001 | 101 | data1.xml | 2016/12/18 12:54:30 | 2 COPIES, COLOR, TWO-SIDED |
| 1002 | 101 | data2.xml | 2016/12/16 15:38:16 | 5 COPIES, COLOR, TWO-SIDED |
| 1003 | 201 | data3.xml | 2016/12/17 08:25:43 | inoue@xxxxxxxxx.co.jp, 1 CASE, A4, AUTO (COLOR/GRAY) |
| | | | | |
| | | | | |
| | | | | |
| | | | | |

FIG.14A

| ORDER | BUTTON ID | PINNING |
|---|---|---|
| 1 | 1001 | OFF |
| 2 | 1003 | OFF |
| 3 | 1002 | OFF |
| 4 | | |
| 5 | | |
| 6 | | |
| 7 | | |
| 8 | | |
| 9 | | |
| 10 | | |

| ORDER | BUTTON ID | PINNING |
|---|---|---|
| 1 | 1002 | ON |
| 2 | 1001 | OFF |
| 3 | 1003 | OFF |
| 4 | | |
| 5 | | |
| 6 | | |
| 7 | | |
| 8 | | |
| 9 | | |
| 10 | | |

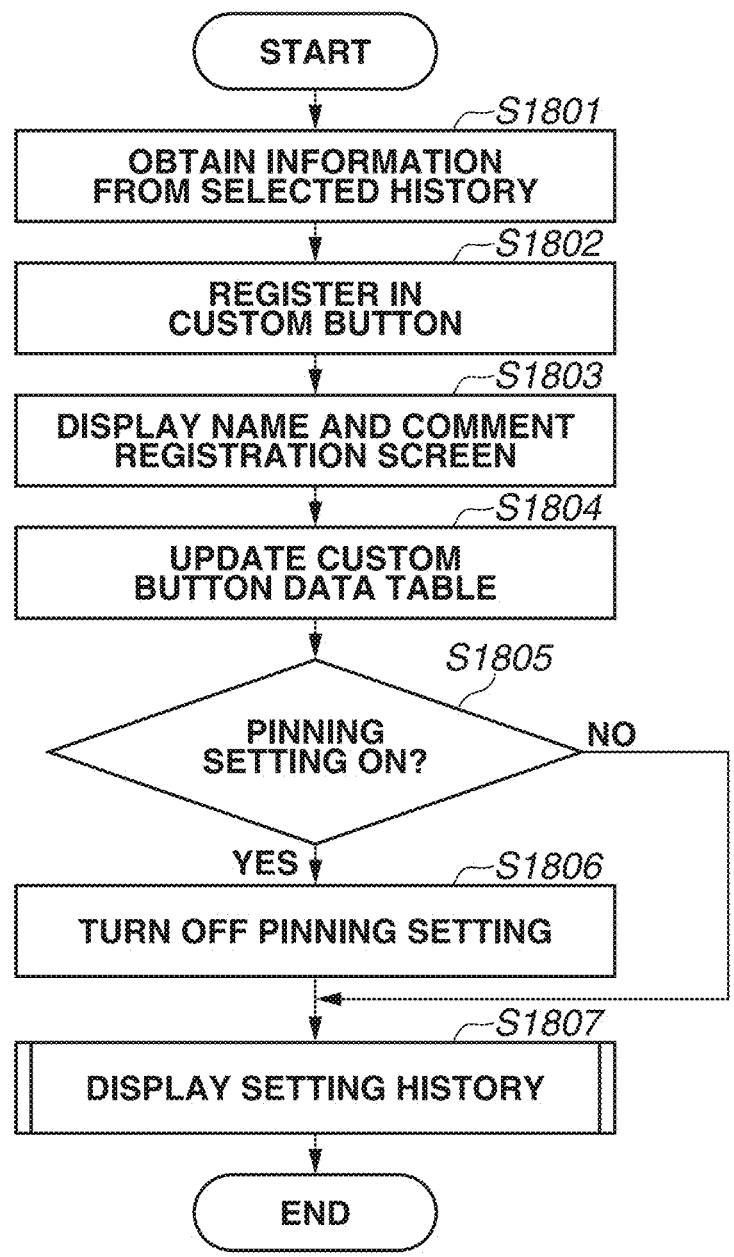

| BUTTON ID | APPLICATION ID | DATA | NAME | COMMENT |
|---|---|---|---|---|
| 1901 | 101 | data1.xml | CONTRACT FORM | |
| 1902 | 101 | data2.xml | REQUEST FORM | |
| 1903 | 101 | data3.xml | | |
| | | | | |
| | | | | |
| | | | | |
| | | | | |
| | | | | |
| | | | | |

| BUTTON ID | APPLICATION ID | DATA | NAME | COMMENT |
|---|---|---|---|---|
| 1901 | 101 | data1.xml | CONTRACT FORM | |
| 1902 | 101 | data2.xml | REQUEST FORM | |
| 1903 | 101 | data3.xml | FOR REGULAR | 5 COPIES, COLOR, TWO-SIDED |
| | | | | |
| | | | | |
| | | | | |
| | | | | |
| | | | | |
| | | | | |

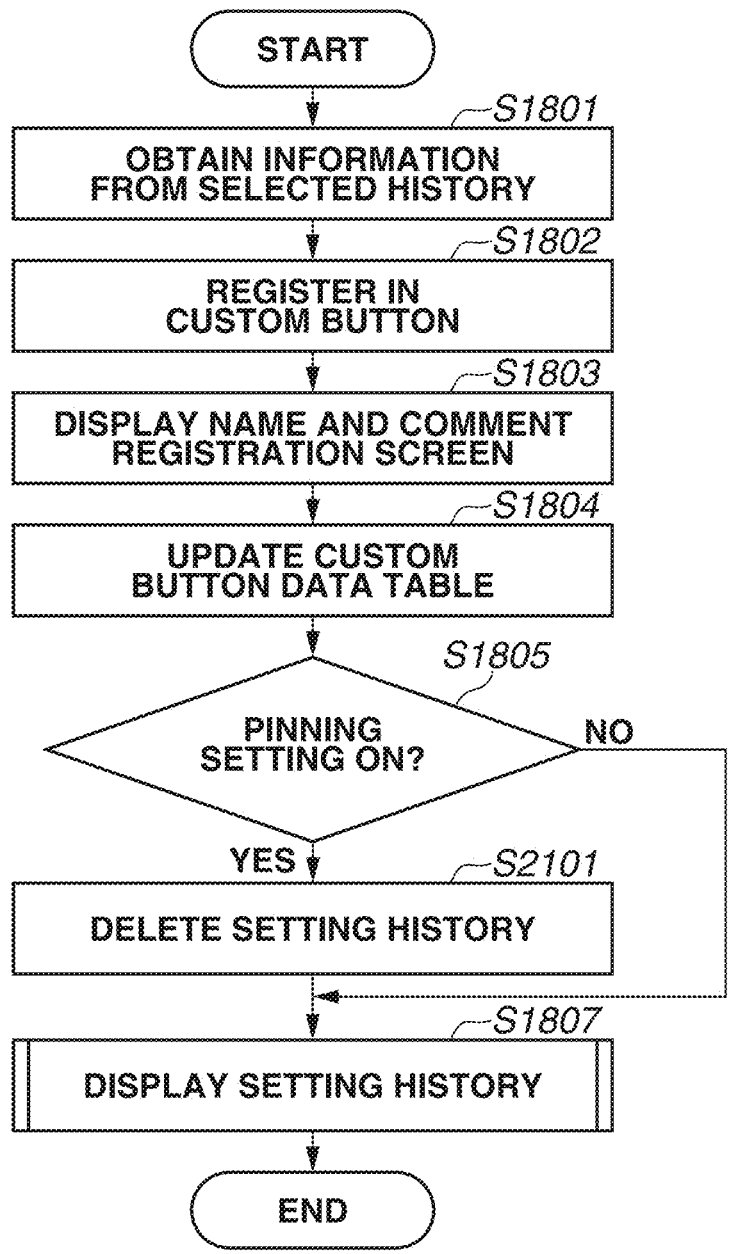

DISPLAY CONTROL FOR AN IMAGE PROCESSING APPARATUS

BACKGROUND

Field

The present disclosure relates to an image processing apparatus, a method for controlling the image processing apparatus, and a storage medium.

Description of the Related Art

Some image processing apparatuses register frequently used job settings in advance and display custom buttons for calling the settings on screens.

Japanese Patent Application Laid-Open No. 2015-146503 describes an image processing apparatus that displays a setting of an executed job as a setting history on a touch panel and displays a job setting screen to which a job setting corresponding to a setting history selected by a user from the displayed setting histories is reflected. Accordingly, when a user executes a job using the same setting as that of the job executed once, the user can use the setting of the relevant job without perform setting again.

The number of job setting histories that the image processing apparatus can read and set is limited. When the number of job setting histories displayed in the image processing apparatus reaches an upper limit, one of the displayed job setting histories needs to be hidden to display a setting history of a new job. Thus, there can be a case that when a user intends to read and set a frequently used setting from the setting histories, the relevant setting history is not displayed. Thus, a job setting stored as a setting history is registered in a custom button, and the job setting set by the relevant setting history can be read and set if the relevant setting history is not displayed.

However, according to Japanese Patent Application Laid-Open No. 2015-146503, when a user selects a certain setting history from a list of the setting histories displayed on a display unit, the user cannot issue an instruction to register the selected setting history to a frequently used setting. Thus, when a custom button is registered, a job setting needs to be performed once to register the job setting to the custom button.

SUMMARY

According to an aspect of the present disclosure, an image processing apparatus includes a display unit configured to display a first button for setting a stored job setting as a setting for a new job and a second button for setting a stored job setting as a custom job setting, and a control unit configured to, in response to selection of the first button, perform control to display a screen for registering the job setting set by the selected first button as the custom job setting set by the second button.

Further features will become apparent from the following description of exemplary embodiments with reference to the attached drawings.

BRIEF DESCRIPTION OF THE DRAWINGS

FIGS. 8A to 8C are schematic diagrams illustrating examples of data tables storing default settings and settings when a job is executed for each function according to the present exemplary embodiment.

FIG. 9 is a flowchart illustrating processing for determining a content to be registered in a data table for managing an integrated history according to the present exemplary embodiment.

FIGS. 10A to 10E illustrate examples of an integrated history data table stored in a hard disk drive (HDD) to display an integrated history according to the present exemplary embodiment.

FIGS. 14A and 14B illustrate data tables for managing an order of setting histories and ON/OFF of pinning to be displayed in the integrated history according to the present exemplary embodiment.

FIG. 17 is a flowchart illustrating processing for registering a setting history displayed in the integrated history in a custom button according to the present exemplary embodiment.

FIGS. 18A and 18B illustrate examples of data tables for managing custom buttons according to the present exemplary embodiment.

FIG. 19 is a flowchart illustrating processing for registering a setting history displayed in an integrated history in a custom button according to a second exemplary embodiment.

DESCRIPTION OF THE EMBODIMENTS

Various exemplary embodiments will be described in detail below with reference to the attached drawings. It is noted that the following exemplary embodiments are not meant to limit the scope of the present disclosure as encompassed by the appended claims. Further, not all combinations of features described in the exemplary embodiments are essential for solving means of the present disclosure.

Figure 1:
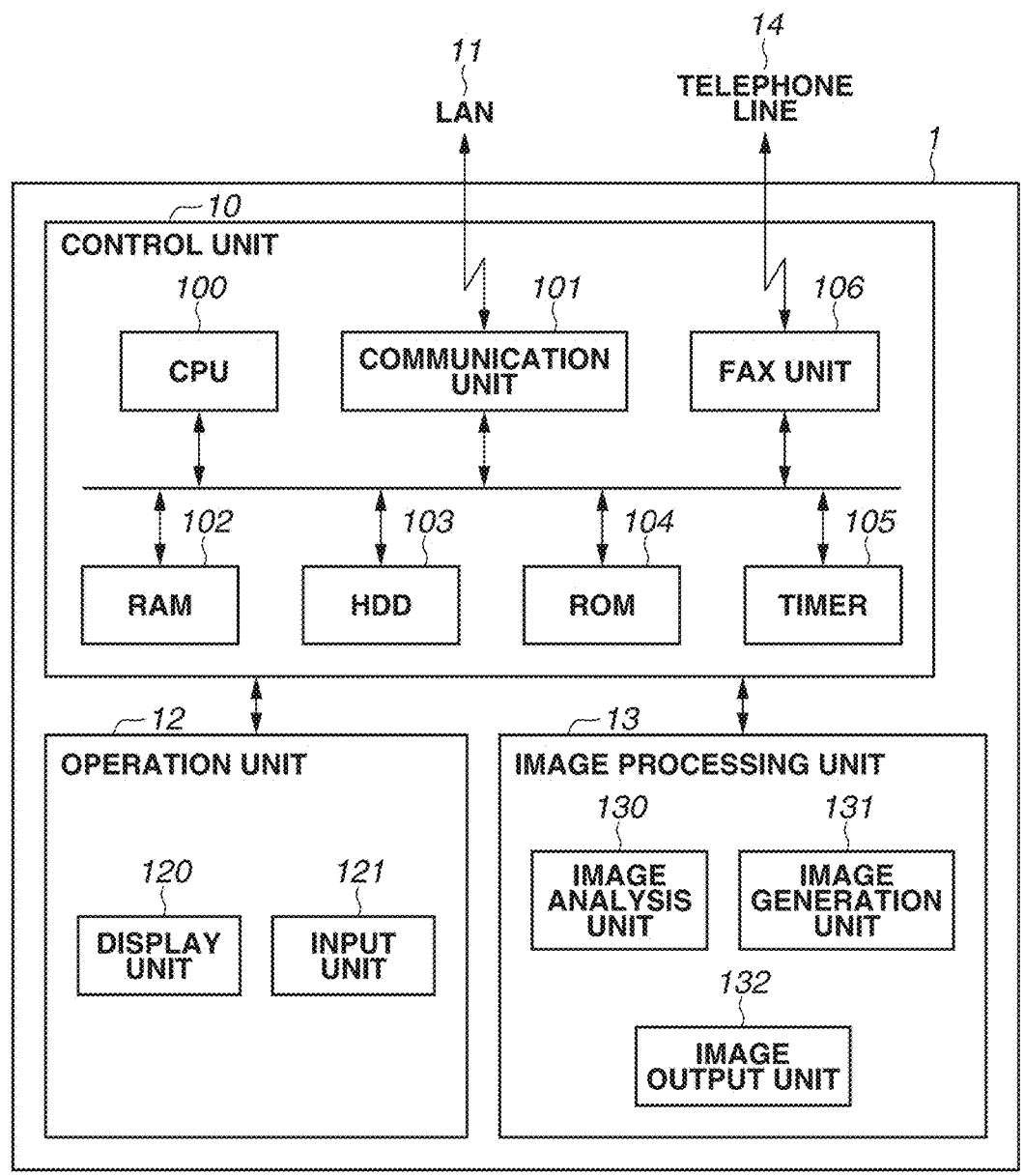
FIG. 1 is a block diagram illustrating a configuration of an image processing apparatus according to an exemplary embodiment.

FIG. 1 is a block diagram illustrating a configuration of an image processing apparatus 1 according to a first exemplary embodiment.

A control unit 10 controls an operation of each unit in the image processing apparatus 1. The control unit 10 includes a central processing unit (CPU) 100, a communication unit 101, a random access memory (RAM) 102, a hard disk drive (HDD) 103, a read only memory (ROM) 104, a timer 105, and a facsimile (FAX) unit 106. The CPU 100 controls the entire control unit 10. The image processing apparatus 1 is connected to the Internet via a local area network (LAN) 11. The communication unit 101 performs transmission and reception of data pieces via the LAN 11. The RAM 102 provides a system work memory for the CPU 100 to operate. The HDD 103 stores a program, document data, and setting data for operating the image processing apparatus 1. The HDD 103 may be a storage medium such as a magnetic disk, an optical medium, and a flash memory. In addition, the HDD 103 does not have to be included within the image processing apparatus 1. For example, the image processing apparatus 1 may use an external server and a personal computer (PC) connected via the communication unit 101 as a storage medium. The ROM 104 is a boot ROM which stores a boot program of the system. The CPU 100 loads a program installed in the HDD 103 to the RAM 102 and performs various types of control based on the program. The timer 105 measures a time in response to an instruction from the CPU 100 and notifies the CPU 100 when the instructed time elapses. The FAX unit 106 transmits and receives facsimile data via a telephone line 14.

An operation unit 12 is controlled by the control unit 10 and constituted of a display unit 120 and an input unit 121. The display unit 120 is a display for displaying information of the image processing apparatus 1 to a user. The input unit 121 receives an input from a user via an interface, for example, a touch panel, a mouse, a camera, a voice input, and a keyboard.

An image processing unit 13 is controlled by the control unit 10 and constituted of an image analysis unit 130, an image generation unit 131, and an image output unit 132. The image analysis unit 130 analyzes a structure of a document image and extracts necessary information from the analyzed result. The image generation unit 131 reads (e.g., scans) a document, generates image data by digitalizing the image of the document, and stores the image data in the HDD 103. In addition, the image generation unit 131 can generate document image data in a different format using the information analyzed by the image analysis unit 130. The image output unit 132 outputs the image data stored in the HDD 103 and others. The image output unit 132, for example, prints the image data on a sheet, transmits the image data to an external device and a server connected via the communication unit 101, and stores the image data in a storage medium connected to the image processing apparatus 1.

Figure 2:
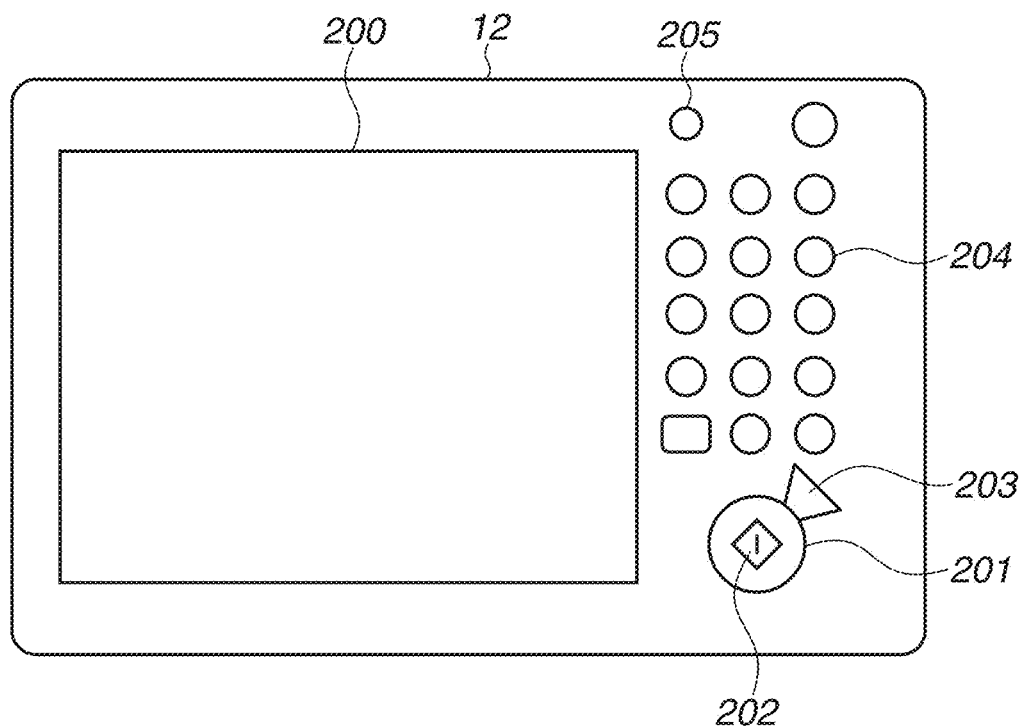
FIG. 2 illustrates an external appearance of an operation unit of the image processing apparatus according to the present exemplary embodiment.

FIG. 2 is an overview diagram of the operation unit 12 according to the present exemplary embodiment.

A touch panel 200 is a liquid crystal display unit, and a touch panel sheet is applied on the liquid crystal display unit. The touch panel 200 displays an operation screen and soft keys and, when a displayed key is pressed, transmits position information thereof to the CPU 100. Thus, the touch panel 200 according to the present exemplary embodiment functions as the display unit 120 and also as the input unit 121 in FIG. 1.

Next, various keys and buttons operated by a user are described. A start key 201 is used when a user instructs a start of a document reading operation and the like. The start key 201 has red and green two color light-emitting diodes (LEDs) 202 in the center, and these colors indicate whether the start key 201 is ready for use. When the green LED 202 is lit, the image processing apparatus 1 can start a job in response to detecting pressing on the start key 201. On the other hand, when the red LED 202 is lit, the image processing apparatus 1 cannot start a job. A stop key 203 is used to stop processing being executed by the image processing apparatus 1. A numeric keypad 204 includes buttons of numbers and characters and is used to set the number of copies and to instruct switching of a screen on the touch panel 200. A user mode key 205 is pressed to perform setting of the image processing apparatus 1.

In the present specification, processing that the CPU 100 reads corresponding screen data and a screen control program from the HDD 103 or the RAM 102 and displays the screen data on the display unit 120 is described as "displays a screen".

First, a home screen and an integrated history for displaying a setting history of a job which are displayed on the display unit 120 of the image processing apparatus 1 are described with reference to FIGS. 5A to 5H. A data table for managing a display content and a display order of a setting history displayed in an integrated history 509 of the home screen is described with reference to FIGS. 10A to 10E and FIGS. 14A and 14B.

Figure 5A:
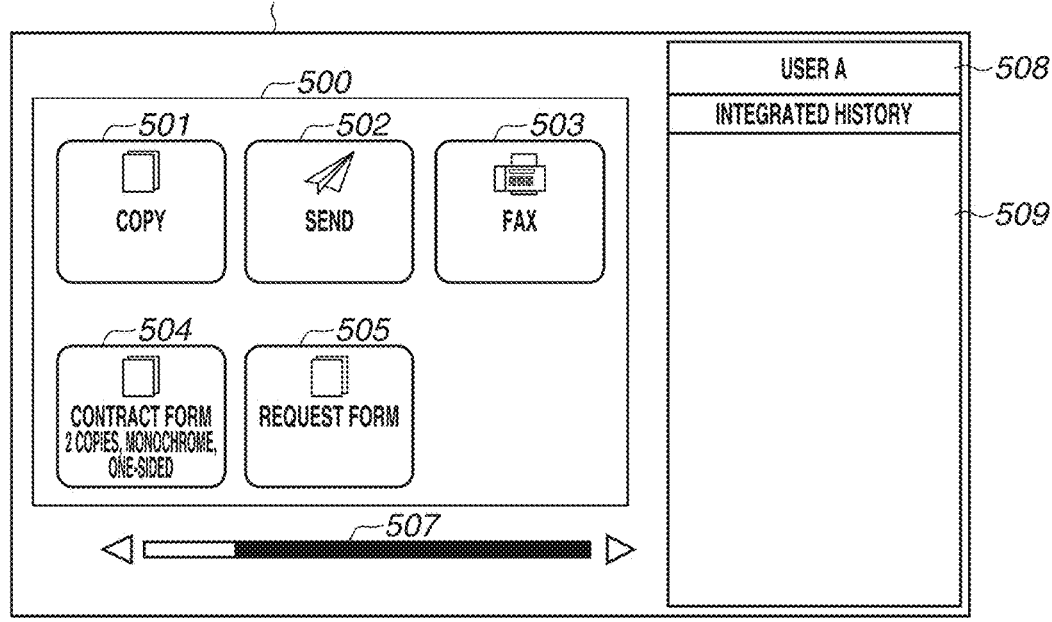
FIGS. 5A to 5H illustrate examples of a home screen displayed on the touch panel of the image processing apparatus according to the present exemplary embodiment.

FIG. 5A illustrates a home screen which is displayed when a user A logs in the image processing apparatus 1. In an area 508, a name of a user who is currently logged-in is displayed.

A menu 500 displaying buttons for starting up each application is displayed on the home screen. In the menu 500, application buttons 501 to 503 for starting up respective applications are displayed in a state in which each default setting value is set thereto. In the menu 500, custom buttons 504 and 505 for starting up respective applications are displayed in a state in which each setting value registered by a user in advance is set thereto. The custom buttons 504 and 505 includes a "my button", which is displayed only on the home screen of the logged-in user and a "shared button", which is displayed on the home screen when other users log in. A user can determine whether to set each custom button to the "my button" or to the "shared button" using a non-illustrated method.

A layout of the application buttons 501 to 503 and the custom buttons 504 and 505 is set by the logged-in user using a non-illustrated method.

A slider bar 507 is used to change an area displayed on the display unit 120 by sliding from side to side on the menu 500. When a user performs an operation, such as to move the slider bar 507 from side to side, to press an arrow button displayed in side of the slider bar 507, and to perform a flick operation in a display area of the menu 500, a non-display area of the menu 500 is displayed on the display unit 120.

The integrated history 509 is an area for displaying a setting history of a job executed by the image processing apparatus 1. In the integrated history 509, the setting history of the executed job is displayed in descending order of execution time regardless of a type of the job. FIG. 5A illustrates a state in which the image processing apparatus 1 does not execute any job yet or a state in which the job setting histories displayed in the integrated history 509 are all deleted. When the image processing apparatus 1 sets an authentication function to ON, only the setting history of the job executed by the logged-in user in the past is displayed in the integrated history 509. The number of setting histories that can be displayed in the integrated history 509 is determined in advance. When the setting histories reach an upper limit of the number of setting histories that can be displayed in the integrated history 509, the setting history including the oldest job execution date and time is not displayed, and the job setting history including the latest execution date and time is displayed instead.

Figure 5B:
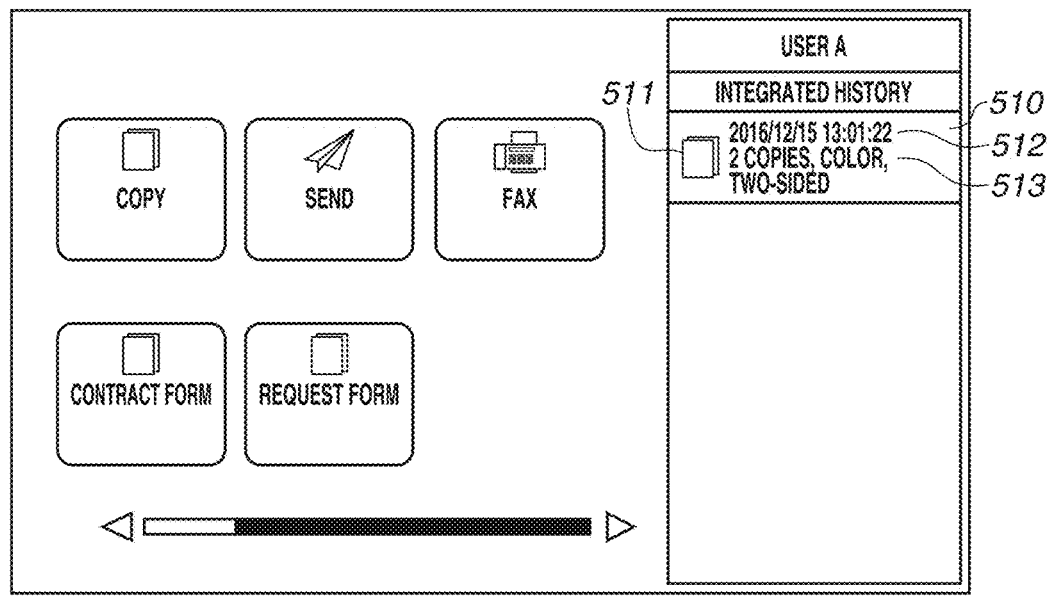

FIG. 5B illustrates the home screen after the user A executes a copy job in the state in FIG. 5A. In FIG. 5B, a setting history 510 is displayed. The setting history 510 includes an application icon 511 indicating a type of the job, a text 512 indicating the job execution date and time, and a text 513 indicating setting values of setting items that are changed from the default setting. For example, the setting history 510 indicates that a setting history is the one of a copy application, and the job was executed after changing the default setting values to two copies of printing, color printing, and two-sided printing. When detecting pressing on the setting history 510, the image processing apparatus 1 starts up the application in a state in which the setting values stored in association with the setting history 510 are set.

Figure 5C:
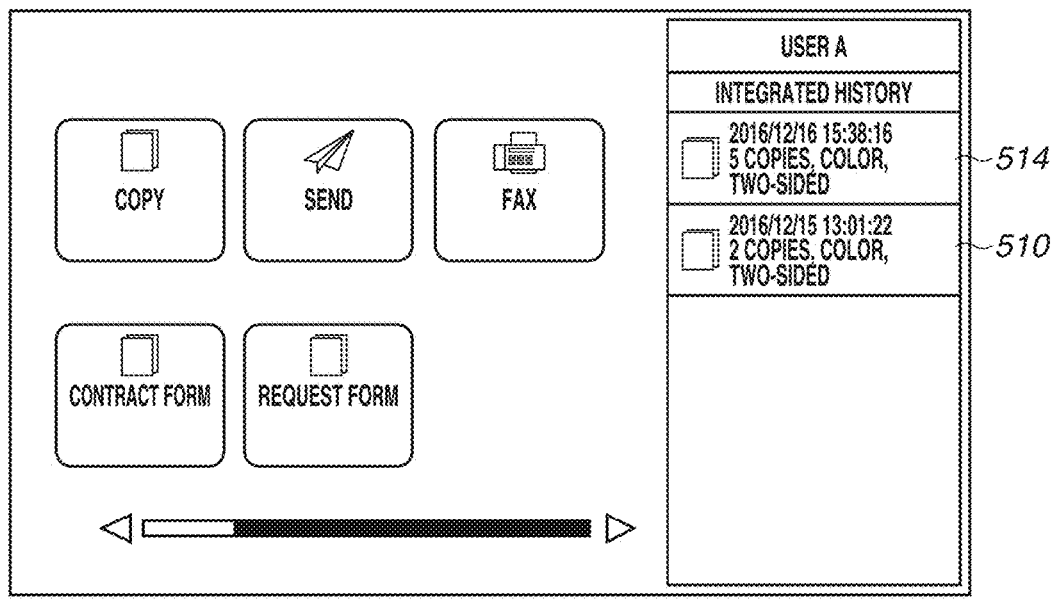

FIG. 5C illustrates the home screen after a copy job is executed using a setting different from the setting history 510 in the state in FIG. 5B. The setting histories 510 and 514 are displayed arranged in descending order of the job execution date and time. In this case, the setting history 510 is older than the setting history 514, so the setting history 510 is displayed below the setting history 514.

Figure 5D:
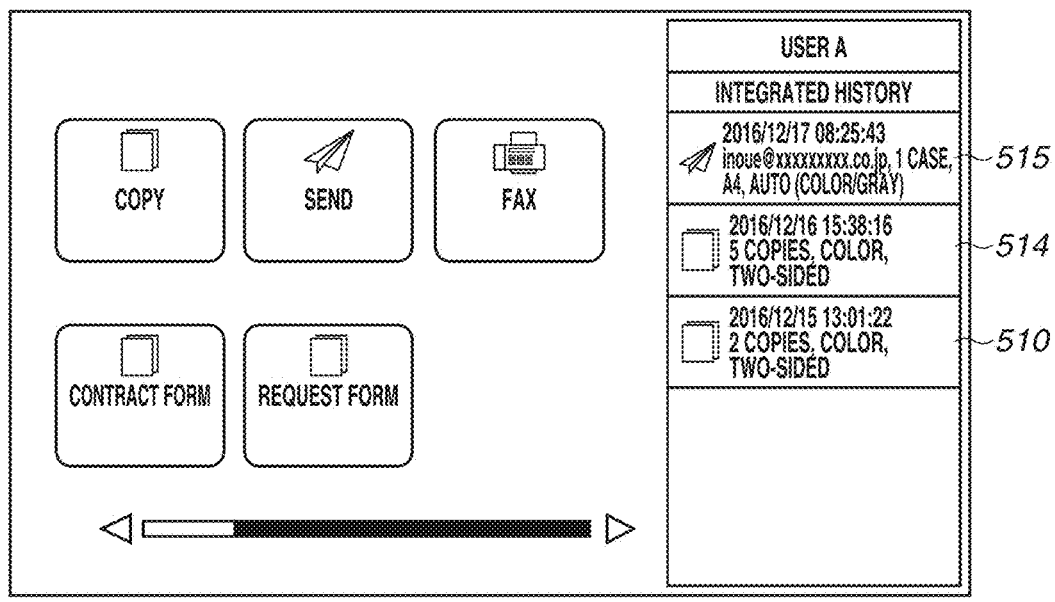

FIG. 5D illustrates the home screen after a transmission job is executed in the state in FIG. 5C. A setting history 515 is the one of an application different from the setting histories 510 and 514, and thus, is displayed with an application icon different from that of the setting histories 510 and 514.

Figure 5E:
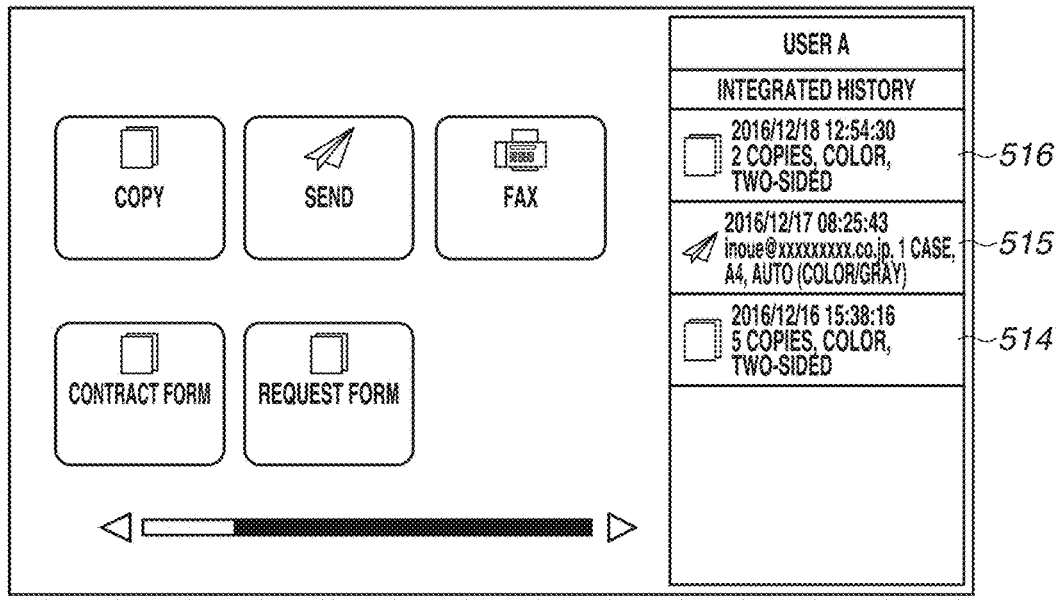

FIG. 5E illustrates the home screen after a user presses the setting history 510 to read the settings in the state in FIG. 5D and executes a job without changing the settings. When a job is executed using the same settings, the setting history 510 including the older executed date and time is not displayed, and only a new setting history 516 is displayed. As described above, if multiple setting histories indicating the same settings, only one is displayed. Thus, the setting histories including various settings can be displayed in the integrated history 509.

Figure 5F:
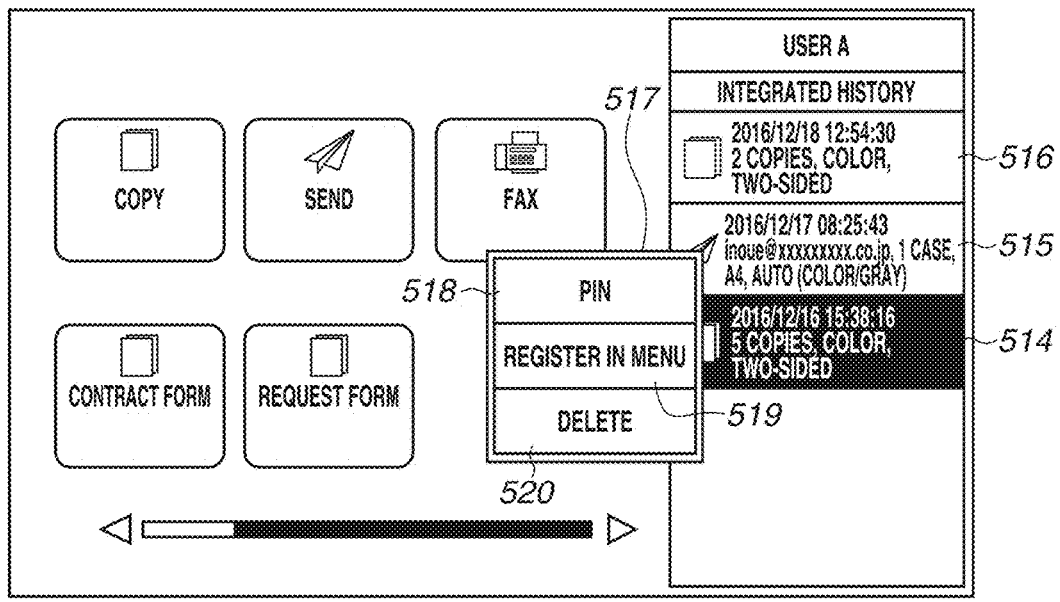

FIG. 5F illustrates a screen that is displayed when a user presses the setting history 514 for a long time (i.e., long press) in the state in FIG. 5E. A long press is an operation that a user continuously presses the setting history for a predetermined time length. When the long press on the setting history 514 is detected, the image processing apparatus 1 displays a context menu 517 in pop-up on the home screen. The context menu 517 is a menu screen for performing a setting on the selected setting history. The context menu 517 includes a "pin" button 518, a "register in menu" button 519, and a "delete" button 520. After the context menu 517 is displayed by the long press on the setting history by a user, the user once releases his/her finger from the touch panel 200 and presses any of the buttons 518 to 520, and thus processing corresponding to the each button is executed. The "pin" button 518 is a button for keeping the display of the selected setting history from disappearing from the integrated history 509. The "register in menu" button 519 is a button for displaying a custom button having the same setting as the selected setting history in the menu 500. In response to detecting pressing on the "register in menu" button 519, the image processing apparatus 1 displays a name and comment registration screen 1701 for setting a name of a custom menu and a comment to be displayed on the custom button on the touch panel 200. Subsequently, the user sets whether to set the custom button as the "my button" or the "shared button". Accordingly, the custom button for calling the setting values displayed as the setting history can be displayed on the menu 500. The "delete" button 520 is a button for not displaying the selected setting history in the integrated history 509.

Figure 5G:
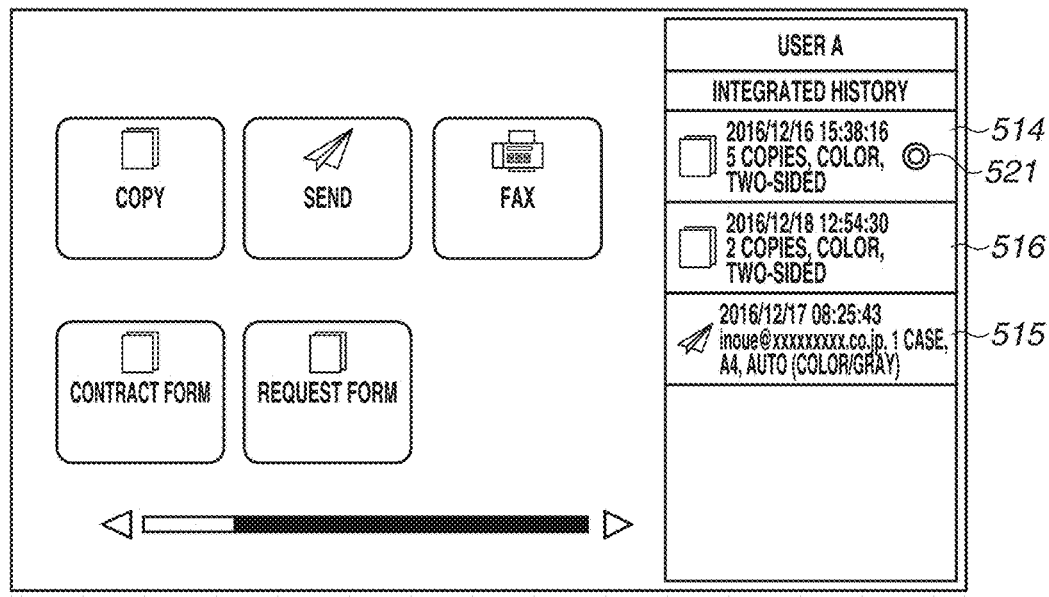

FIG. 5G illustrates the home screen after the "pin" button 518 is pressed in the state in FIG. 5F. The setting history instructed to be pinned is displayed at the top of the integrated history 509. In addition, a pinning icon 521 is added to indicate that the relevant setting history is pinned. When a user executes a job in a state in which the pinned setting history is displayed in the integrated history 509, the setting history including the latest executed date and time is displayed under the pinned setting history.

The image processing apparatus 1 according to the present exemplary embodiment can set pinning to the setting history displayed in the integrated history 509. A user sets pinning to the setting history frequently used by calling from the setting history, and thus the relevant setting history can be prevented from not being displayed in the integrated history 509. Pinning does not require settings such as a name and an input of comment. Thus, a user can easily display the setting history as a frequently used setting in the integrated history 509. In addition, the pinned setting history is displayed above the other setting histories, and thus the relevant setting history can be easily searched from the integrated history 509.

Figure 5H:
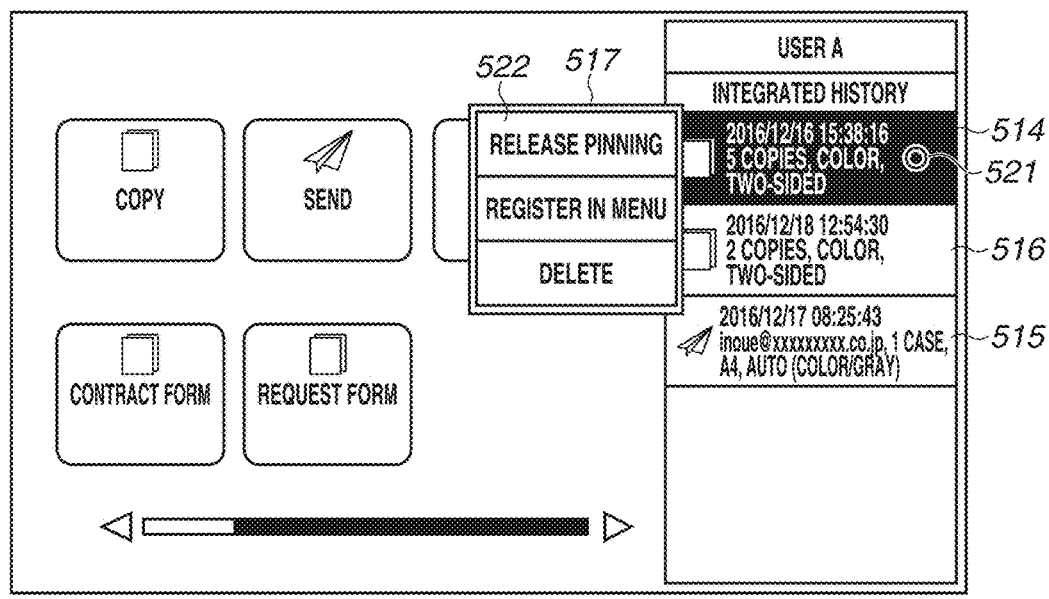

FIG. 5H illustrates a screen displayed when the pinning setting is released from the setting history to which pinning is set in FIG. 5G. In response to a long press on the pinned setting history, the image processing apparatus 1 displays the context menu 517. The context menu 517 includes a "release pinning" button 522, the "register in menu" button 519, and the "delete" button 520. In response to pressing on the "release pinning" button 522 by a user, the image processing apparatus 1 releases the pinning setting of a button identification (ID) corresponding to the relevant setting history and displays the integrated history 509 in which the setting histories are sorted in descending order of the job execution time.

Figure 16A:
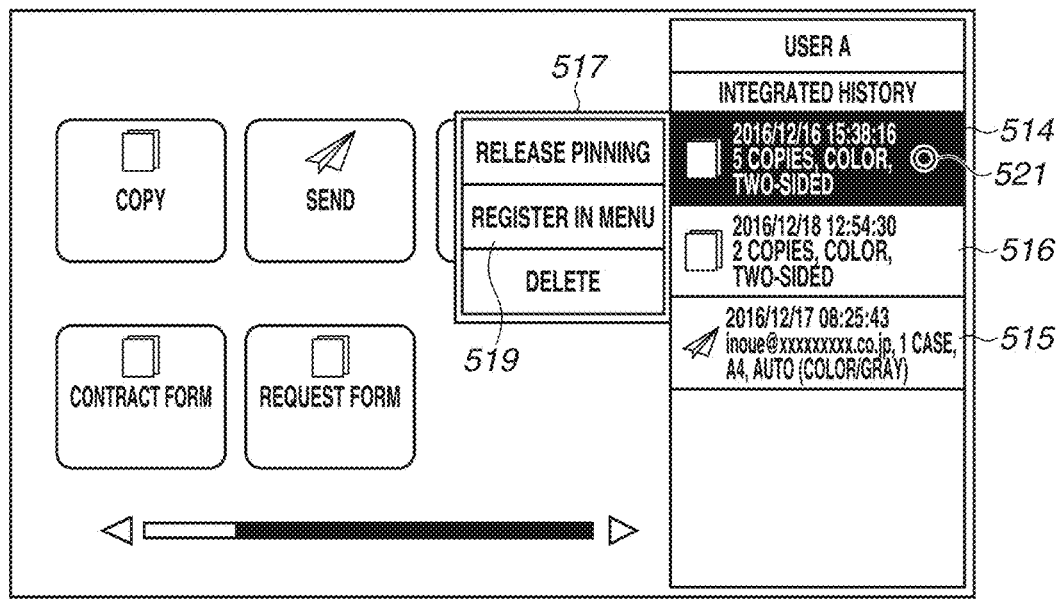
FIGS. 16A to 16D illustrate examples of screens displayed when a custom button is registered from a setting history displayed in the integrated history according to the present exemplary embodiment.
Figure 16B:
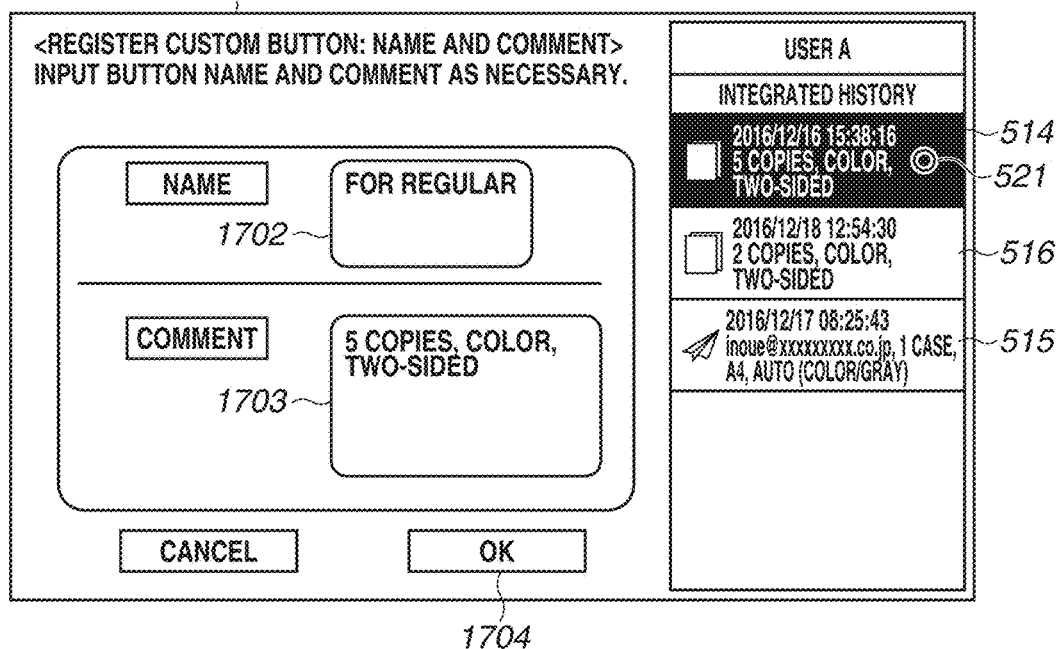

A screen which is displayed on the touch panel 200 when the setting history displayed in the integrated history 509 is registered in the custom button is described with reference to FIGS. 16A to 16D. FIG. 16A illustrates a screen which displays the context menu 517 in response to a long press on the pinned setting history 514 in the state in FIG. 5G. When detecting pressing on the "register in menu" button 519, the CPU 100 displays the name and comment registration screen 1701 for the custom button illustrated in FIG. 16B on the touch panel 200. FIG. 16B illustrates the name and comment registration screen 1701 after a user respectively inputs "for regular" and "5 copies, color, two-sided" in a name input area 1702 and a comment input area 1703.

Figure 16C:
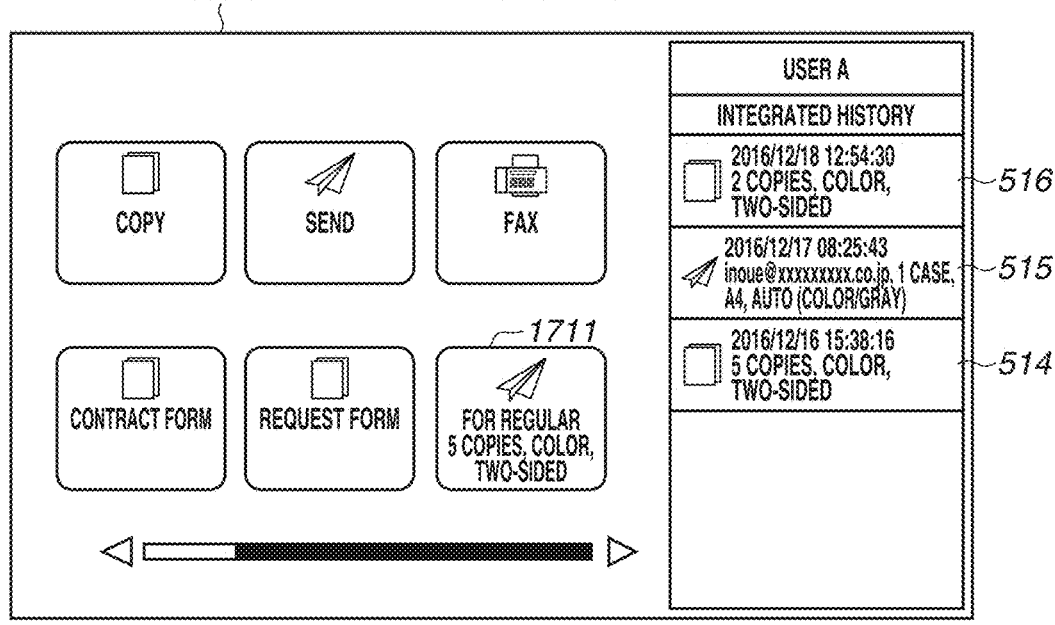
Figure 16D:
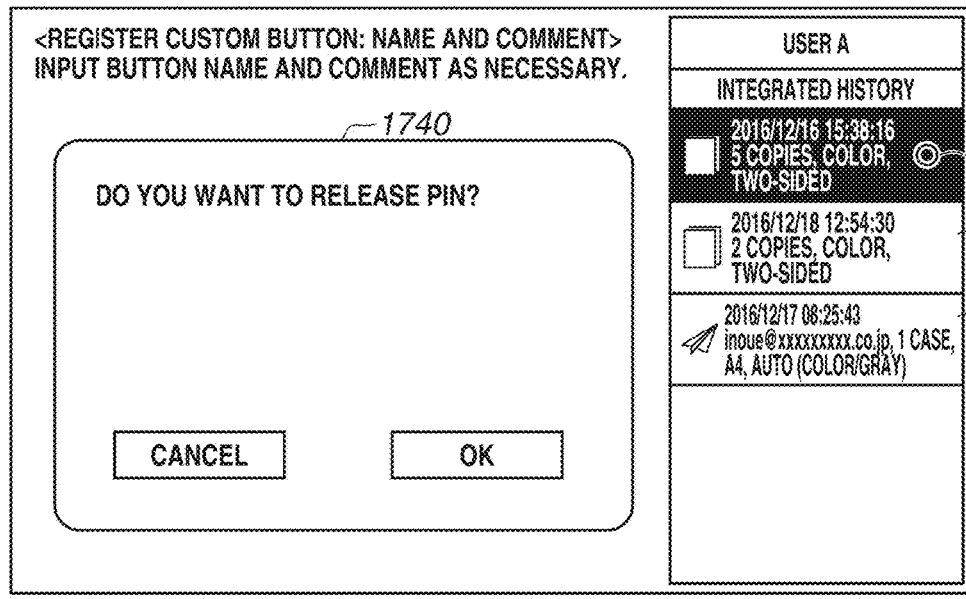

In response to detecting pressing on an "OK" button 1704, the CPU 100 displays a home screen 1730 illustrated in FIG. 16C on the touch panel 200. At that time, a newly registered custom button 1711 is displayed in the home screen 1730. In addition, the pinning setting of the setting history 514 in the integrated history 509 is released. Thus, the pinning icon 521 is not displayed in the setting history 514. Further, the pinning is released, and thus the histories 514 to 516 are displayed by being sorted in the order of the job execution time. When a user presses the generated custom button, a setting screen of a job is displayed on the touch panel 200 in which setting values stored in association with the custom button are set.

As illustrated in FIGS. 16A to 16D, when the pinned setting history is registered in a menu as the custom button, the pinning setting of the relevant setting history is released. A user may temporarily select a frequently used setting from the setting histories in the integrated history 509 and set pinning thereto. Subsequently, when being constantly used, the user registers the relevant setting in the custom button by adding a name and a comment thereto so as to be able to recognize what kind of situation the setting is used. In this regard, there is a possibility that when the custom button and the pinned setting history both indicating the same setting are displayed, a user is confused about which button is used to call the setting. Therefore, in response to a fact that the pinned setting history is registered in the custom button, the pinning setting of the relevant setting history is released. Accordingly, the pinning setting of the relevant setting history can be released without causing a user to perform an operation to release the pinning setting of the relevant setting history after registering the pinned setting history in the custom button.

FIGS. 10A to 10E illustrate examples of an integrated history data table 1000 for managing the setting history displayed in the integrated history 509. The data tables illustrated in FIGS. 10A to 10E are stored in the HDD 103. As shown in a table header, the present table stores a button ID, an application ID, data, and text data of a date and time and a setting value displayed on the home screen.

The button ID is a number for identifying a button indicating the setting history displayed in the integrated history 509.

The application ID is a number for indicating which application the relevant setting history is related to. A correspondence between an application type and an application ID is determined in advance. For example, it is determined that an application ID of a copy job is "101", and an application ID of a transmission job is "201".

Data is a name of a file storing setting values of the relevant setting history. The file is in a format readable by each application and stores setting values of all settings used in the relevant application. For example, in case of a copy application, the number of copies, setting of monochrome or color in printing, and a sheet size are included.

A displayed text is a text indicating date and time and a setting content displayed in the setting history in the integrated history 509. The date and time is text data indicating a date and a time when a job of the relevant setting history was executed. The setting value is text data of a setting which satisfies a predetermined condition in settings stored as the setting history. For example, the setting value includes a setting value of a setting item which is changed from the default setting by a user. The execution date and time and the settings of the job are displayed in the integrated history 509 which makes it easier for a user to remember when the job was executed and what kind of setting is used based on the setting history.

FIG. 10A corresponds to FIG. 5A, and the setting history is not yet registered in the integrated history data table 1000.

FIG. 10B corresponds to FIG. 5B, and the setting history 510 corresponds to data of a button ID 1001. The button ID 1001 is a setting history of a copy job having an application ID "101" and respectively includes "data1.xml", "2016/12/15 13:01:22", and "2 copies, color, two-sided" in a file name for storing the setting value, the date and time text, and the setting value text.

FIG. 10C corresponds to FIG. 5C, and the setting history 514 corresponds to data of the button ID 1002.

FIG. 10D corresponds to FIG. 5D, and the setting history 515 corresponds to data of the button ID 1003.

FIG. 10E corresponds to FIG. 5E, and the setting history 516 corresponds to data of the button ID 1001. In FIG. 10E, the date and time in the displayed text of the button ID 1001 is updated from "2016/12/15 13:01:22" to "2016/12/18 12:54:30".

FIGS. 14A and 14B are examples of a data table 1500 for managing a display order of the setting histories managed in the integrated history data table 1000 and ON and OFF of a pinning flag. The data table 1500 is stored in the HDD 103.

An "order" column indicates an order of displaying each setting history. A "button ID" column stores the button ID of the setting history displayed in the integrated history 509. A "pinning" column stores information indicating ON or OFF of a pinning flag in the setting history of the button ID on the left.

For example, FIG. 14A is the data table 1500 for displaying the home screen illustrated in FIG. 5E. In the integrated history 509, the setting histories are displayed in the order of the button IDs 1001, 1003, and 1002 from the top. In other words, the setting histories are displayed in the order of the setting histories 516, 515, and 514 in the integrated history 509. In addition, the pinning flag is OFF in either setting history of the button ID, and thus the pinning is not set.

On the other hand, FIG. 14B is the data table 1500 when the home screen illustrated in FIG. 5G is displayed. The setting history 514 of the button ID 1002 in which the pinning is set to ON is displayed on the top, and subsequently, the setting histories of the button IDs 1001 and 1003 are displayed in the order of the executed date and time.

Processing executed by the image processing apparatus 1 is described below with reference to a flowchart.

Figure 3:
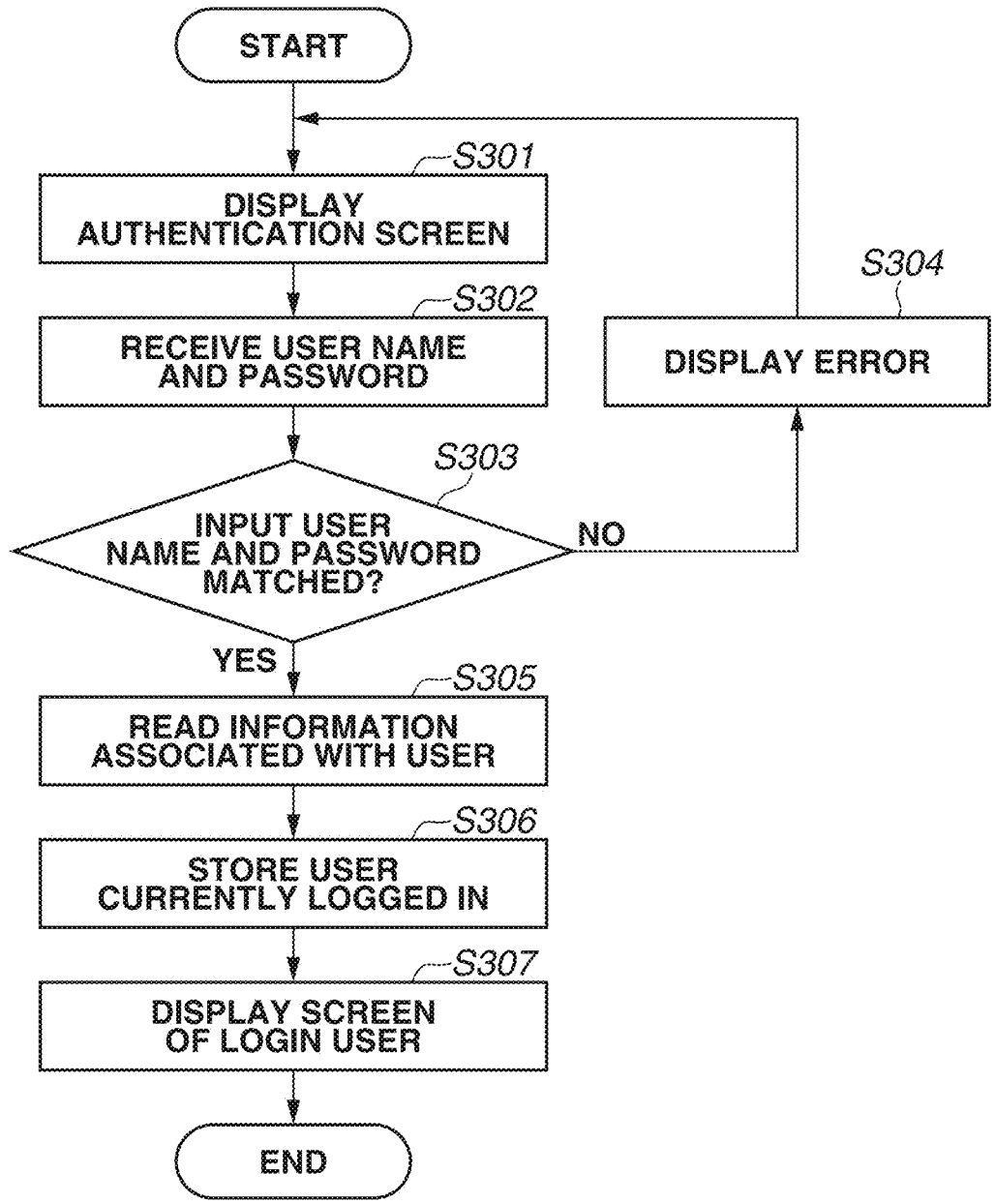
FIG. 3 is a flowchart illustrating processing from starting up the image processing apparatus to displaying a screen of a logged-in user.
Figure 4:
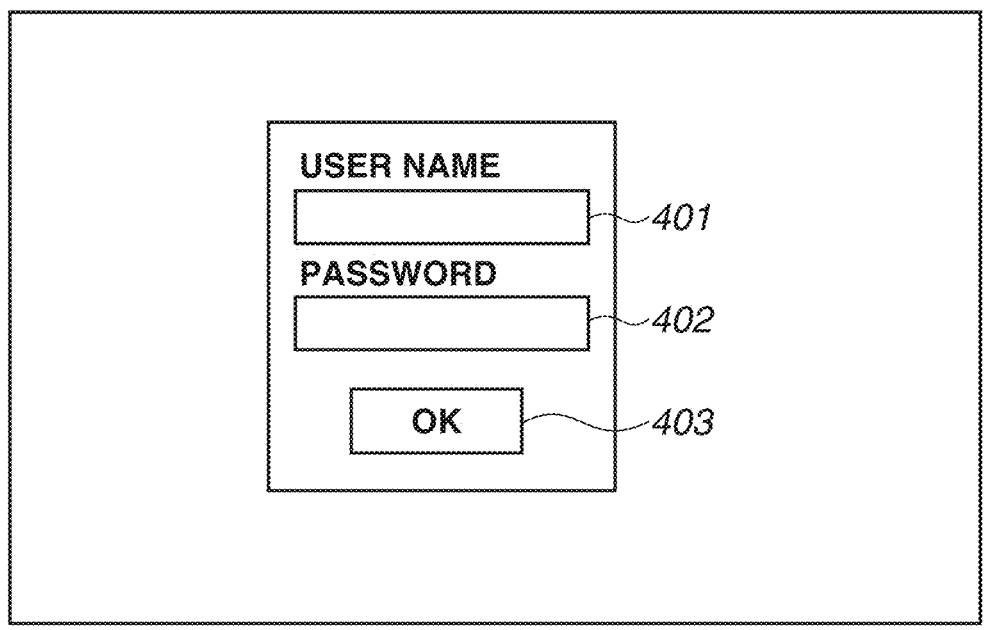
FIG. 4 illustrates an example of an authentication screen displayed on a touch panel according to the present exemplary embodiment.

First, processing for logging in the image processing apparatus 1 by a user is described with reference to FIGS. 3 and 4. FIG. 3 is a flowchart illustrating processing from starting up the image processing apparatus 1 according to the present exemplary embodiment to displaying a screen of the logged-in user. The processing described in the present flowchart is realized by the CPU 100 executing a program stored in the HDD 103 or the ROM 104. The processing illustrated in FIG. 3 is started when a power source of the image processing apparatus 1 is turned ON.

In step S301, the CPU 100 displays an authentication screen on the touch panel 200. FIG. 4 illustrates an example of the authentication screen displayed on the touch panel 200. The authentication screen includes a user name input area 401, a password input area 402, and an "OK" button 403.

In step S302, after displaying the authentication screen on the touch panel 200, the CPU 100 receives an input of a user name and a password. In response to detecting pressing on the user name input area 401 or the password input area 402, the CPU 100 displays a soft keyboard, not illustrated, on the touch panel 200. A user inputs the user name and the password by pressing the soft keyboard. When detecting pressing on the "OK" button 403, the CPU 100 advances the processing to step S303.

When detecting pressing on the "OK" button 403, in step S303, the CPU 100 determines whether a user name and a password stored in the HDD 103 match with the input user name and password. In the case where the input user name and password do not match with the user name and the password stored in the HDD 103 (NO in step S303), in step S304, the CPU 100 displays an error message on the touch panel 200 and then displays the authentication screen again.

In the case where the user names and passwords respectively match with each other (YES in step S303), in step S305, the CPU 100 calls information associated with the user stored in the HDD 103. The information associated with the user is, for example, information indicating a history of a job executed by the logged-in user and information regarding the custom button displayed on the menu screen illustrated in FIG. 5. For example, the integrated history data table 1000 illustrated in FIGS. 10A to 10E and a custom button data table 1900 illustrated in FIGS. 18A and 18B may be included.

In step S306, the CPU 100 stores the authenticated user as a currently logged-in user in the HDD 103. Subsequently, in step S307, the CPU 100 displays the home screen to which the called information of the logged-in user is reflected on the touch panel 200.

Next, processing until a user logged in the image processing apparatus 1 executes a job is described with reference to FIG. 6 to FIGS. 8A to 8C.

First, a series of operations until a user executes a job in the image processing apparatus 1 is described with reference to FIGS. 7A to 7C.

After a user logged in the image processing apparatus 1, the home screen illustrated in FIG. 5 is displayed on the touch panel 200. The user selects an application to use from the menu 500 on the home screen. An example when a user selects a copy application is described.

A user presses the application button 501 displayed in the menu 500 on the home screen. When detecting pressing on the application button 501 by the user, the image processing apparatus 1 displays a "copy" screen 700 illustrated in FIG. 7A on the touch panel 200. FIG. 7A illustrates the "copy" screen 700 in a state in which the default setting values are set. The "copy" screen 700 is a job setting screen of a copy function.

The "copy" screen 700 includes an area 701 for displaying setting values of color, magnification, a sheet size, and the number of copies and buttons for performing settings. A button 702 is used to confirm settings currently set in a list. When a user presses the button 702, details of settings currently set are displayed on the touch panel 200. A "color selection" button 703 is used to set monochrome printing or color printing in copying. A "magnification" button 704 is used to set a magnification in copying. A "sheet selection" button 705 is used to set a size and a type of a sheet to be used in printing. A "finishing" button 706 is used to set whether to shift a sheet discharge position for every copy or for every page when a printed sheet is discharged and the like. A "two-sided" button 707 is used to set whether to perform two-sided printing or one-sided printing in copying. A "density" button 708 is used to set density in printing. A "document type" button 709 is used to set a type of a document to be read by a scanner. An "ID card copy" button 710 is used to perform setting for printing both of front and rear surfaces of a document on one side of a sheet. An "other functions" button 711 is used to set an item which cannot be set on the "copy" screen 700 such as a setting for assigning a page number or a management number on a printed product. A "setting history" button 712 is used to use a setting of a copy job executed by a user in the past. A "frequently used setting" button 713 is used to set a setting registered in advance by a user.

An icon 715 is a button for registering a setting displayed on the setting screen of the current job in the custom button or in a frequently used setting.

Figure 7A:
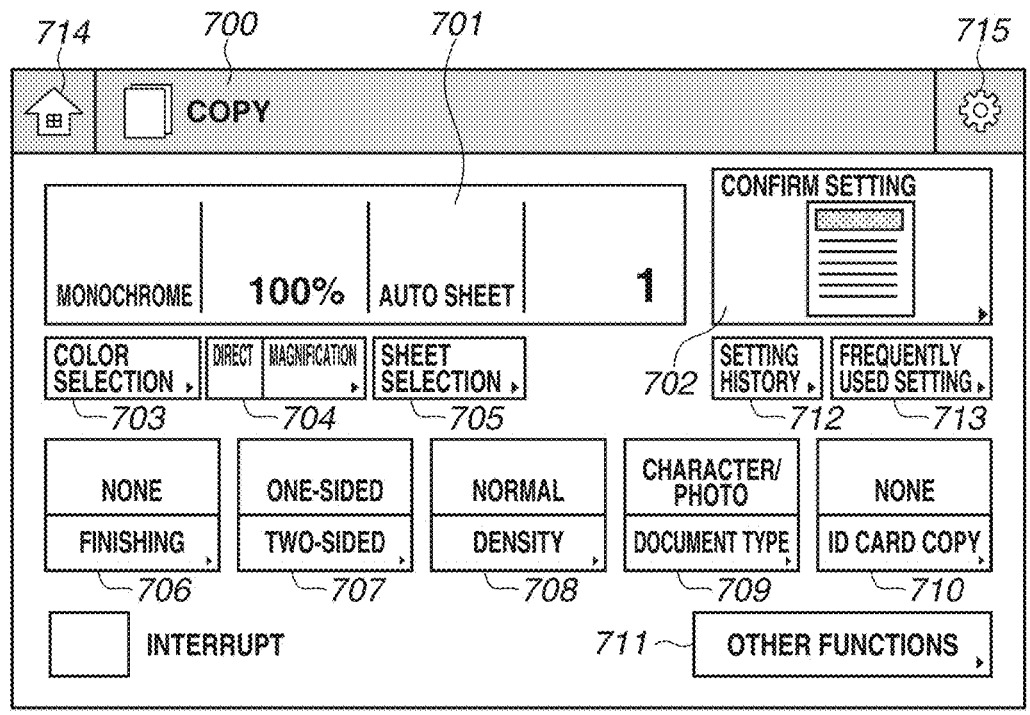
FIGS. 7A to 7C are schematic diagrams illustrating examples of a copy screen of a copy function of the image processing apparatus according to the present exemplary embodiment.
Figure 7B:
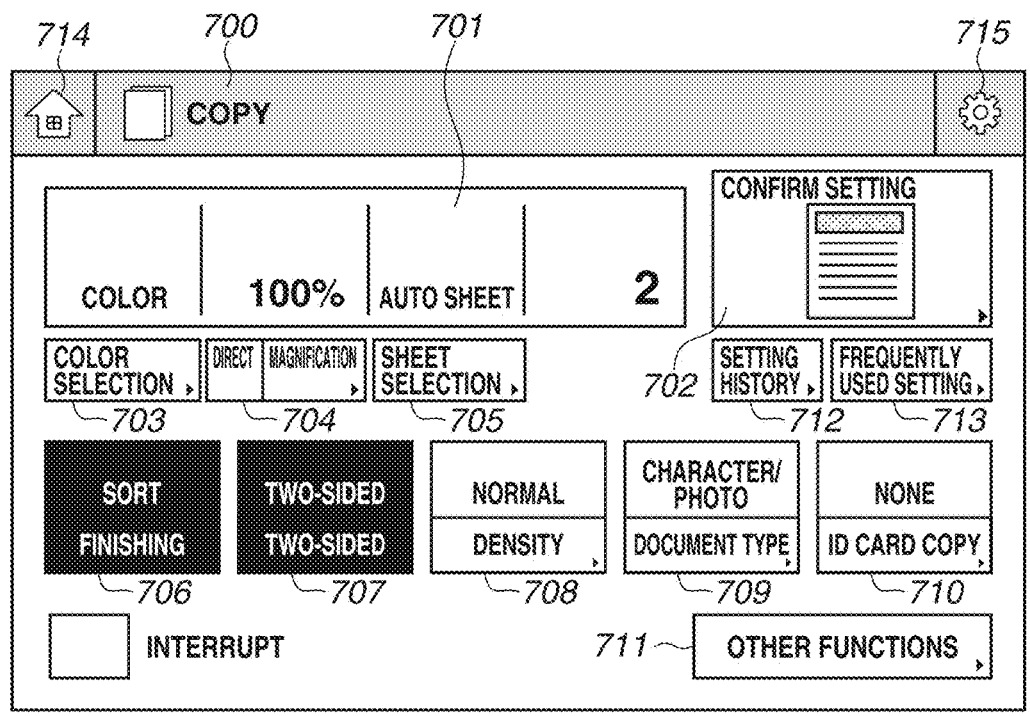

FIG. 7B illustrates the "copy" screen 700 when the user sets color printing, the number of copies as two, a sort setting for changing the sheet discharge position of a print product for every copy, and two-sided printing. The user performs setting using the touch panel and then presses the start key 201. When detecting pressing on the start key 201, the image processing apparatus 1 executes a job according to the settings set via the touch panel 200.

Figure 7C:
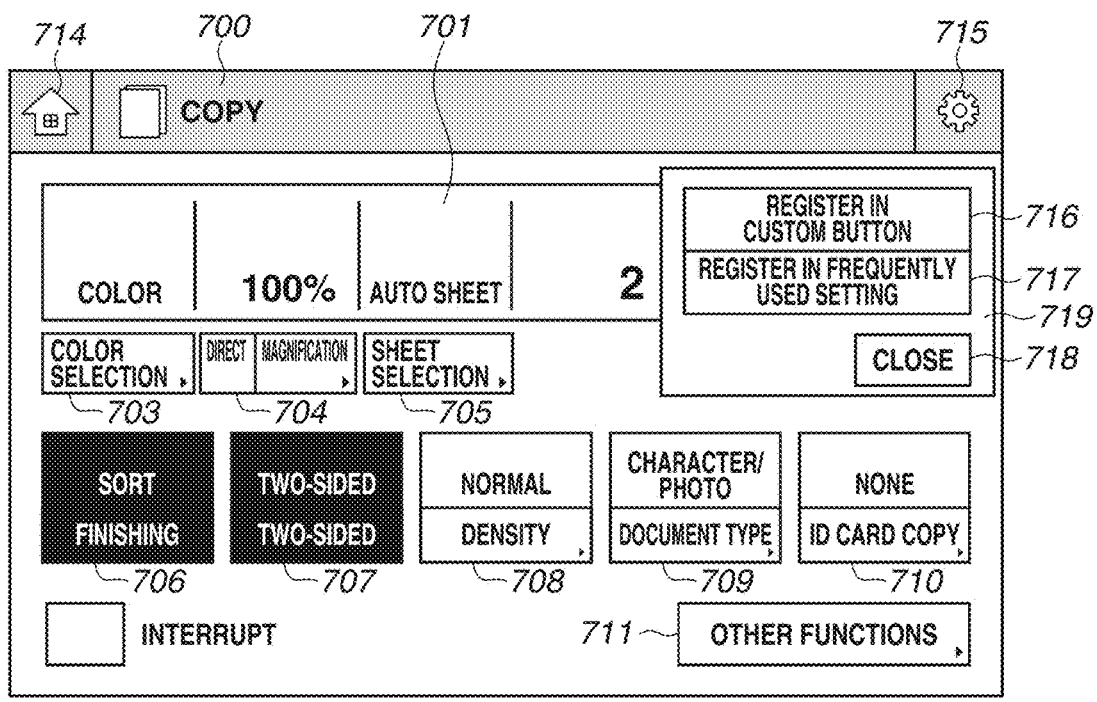

FIG. 7C illustrates a screen displayed on the touch panel 200 when the user presses the icon 715. A "register in custom button" button 716 is used to register the setting set to the setting screen of the displayed job in the custom button. When detecting pressing on the "register in custom button" button 716, the CPU 100 generates a file for storing the currently set setting value. The CPU 100 registers the application ID of the displayed application and a file name for storing the set setting values in the custom button data table 1900 described below with reference to FIGS. 18A and 18B. The CPU 100 displays the name and comment registration screen 1701 described below with reference to FIG. 16B on the touch panel 200. In response to pressing on the "OK" button 1704 on the name and comment registration screen 1701, the CPU 100 registers the input name and comment in the custom button data table 1900 and displays the custom button on the menu screen.

A "register in frequently used setting" button 717 is used to register the setting set on the displayed job setting screen as a setting being able to be called from the "frequently used setting" button 713. A "close" button 718 is used to close a menu 719 which is displayed in pop-up when the icon 715 is pressed.

Figure 6:
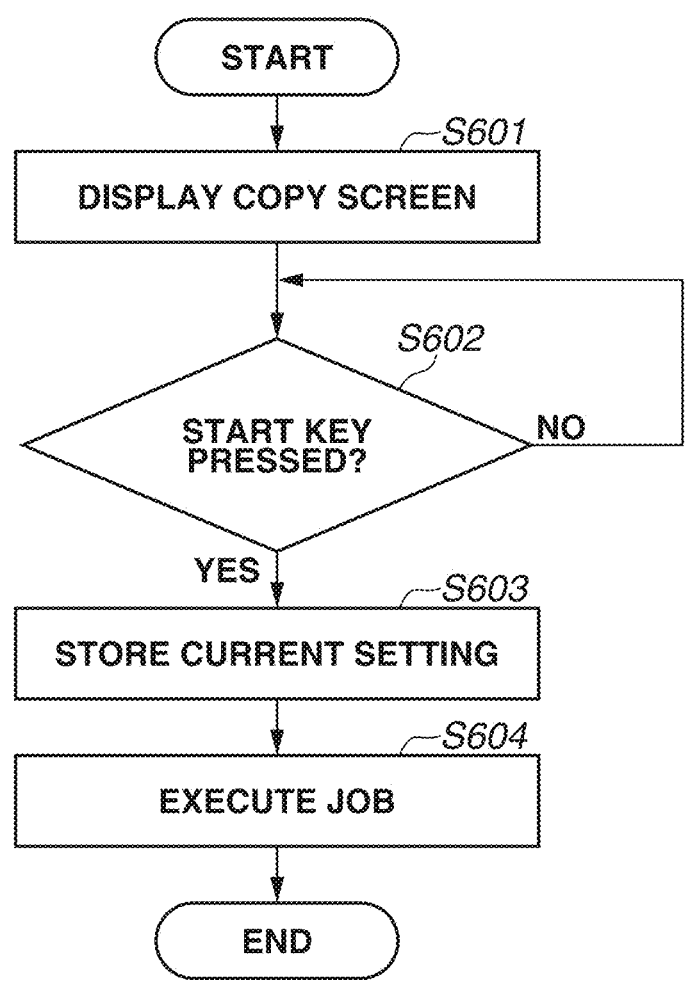
FIG. 6 is a flowchart illustrating processing from starting up an application to executing a job according to the present exemplary embodiment.

FIG. 6 is a flowchart illustrating processing from starting up an application to executing a job by the image processing apparatus 1. The processing described in FIG. 6 is realized by the CPU 100 executing a program stored in the HDD 103 or the ROM 104.

In FIG. 6, a case is described as an example in which a user selects the copy application on the menu 500.

In step S601, in response to detecting pressing on the application button 501 displayed on the menu 500, the CPU 100 displays the "copy" screen 700 illustrated in FIG. 7A in which the default setting values are set on the touch panel 200. Subsequently, the CPU 100 receives a copy job setting from the user.

In step S602, the CPU 100 determines whether the start key 201 is pressed. The CPU 100 continuously performs the processing described in step S602 until pressing on the start key 201 is detected.

In response to detecting pressing on the start key 201 (YES in step S602), in step S603, the CPU 100 stores the set job setting in the HDD 103. FIG. 8A is a schematic diagram of a data table for storing the copy job setting. A copy data table 800 is stored in the HDD 103. A default setting 802 in a first line of the copy data table 800 indicates the default setting values of the copy function, and a current setting 803 in a second line indicates job setting values set when the CPU 100 detects pressing on the start key 201.

In step S604, the CPU 100 stores the current setting in the HDD 103 and then executes the job by controlling the image processing unit 13. The CPU 100 controls the image processing unit 13 to generate an output image to which the setting set in the "copy" screen 700 is reflected. The image processing apparatus 1 prints the generated output image on a sheet.

In FIG. 6, the example in which the image processing apparatus 1 executes the copy job is described. A type of a job executed by the image processing apparatus 1 is not limited to a copy job, and the image processing apparatus 1 performs similar processing when executing a transmission job, a facsimile job, a print job, and a scan job. For example, when a transmission job is executed, in step S603, the CPU 100 stores the current setting value in a transmission data table 1400 stored in the HDD 103. FIG. 8C illustrates an example of a transmission data table related to a transmission job. A default setting 1402 includes setting values registered in advance in the image processing apparatus 1, and a current setting 1403 includes setting values set when the transmission job is executed.

Processing for displaying the setting history in the integrated history 509 after executing the job is described with reference to FIGS. 9, 11, and 12.

FIG. 9 is a flowchart illustrating processing for determining a content to be registered in the integrated history data table 1000 from the job setting stored as the current setting by the image processing apparatus 1.

The processing described in FIG. 9 is realized by the CPU 100 executing a program stored in the HDD 103 or the ROM 104. The processing described in FIG. 9 is executed in response to completion of the processing described in FIG. 6.

In step S901, the CPU 100 obtains information registered in the integrated history data table 1000 stored in the HDD 103. The CPU 100 refers to the application ID of the executed job and obtains information of a data row in the setting history including the application ID same as that of the executed job from the integrated history data table 1000.

In step S902, the CPU 100 compares the current setting 803 with the data obtained in step S901 of the setting history stored in the integrated history data table 1000 and determines whether the setting same as the current setting is stored in the integrated history data table 1000.

When the setting history including the setting same as the current setting does not exist in the integrated history data table 1000 (NO in step S902), in step S903, the CPU 100 executes processing for generating text data to be displayed in the integrated history 509. The processing executed by the CPU 100 in step S903 is described below with reference to FIG. 11.

After generating the text to be displayed as the setting history, in step S904, the CPU 100 stores contents to be registered in the integrated history data table 1000 in the HDD 103. The contents to be registered in the integrated history data table 1000 include the application ID, a file name of the set data, the text data indicating the setting value and the executed date and time, and a flag indicating existence or non-existence of the existing data. The flag indicating existence or non-existence of the existing data is a flag which is determined based on the determination result in step S902 and indicates whether the setting history including the setting same as the setting of the executed job is stored in the HDD 103. In step S904, the flag indicating existence or non-existence of the existing data indicates non-existence since a setting history is newly generated.

In step S902, when the setting history including the setting same as the setting of the currently executed job is stored in the integrated history data table 1000 (YES in step S902), the CPU 100 executes following processing. In step S905, the CPU 100 generates text data indicating the job execution date and time. Subsequently, in step S906, the CPU 100 stores the button ID of the setting history indicating the setting same as that of the executed job, the text data generated in step S905 which indicates the job execution date and time, and the flag indicating existence or non-existence of the existing data in the HDD 103. In step S906, the setting of the executed job is the same as the setting stored in the integrated history data table 1000, so that the flag indicating existence or non-existence of the existing data indicates existence.

After completing the processing described in step S904 or S906, the CPU 100 terminates the processing illustrated in FIG. 9.

Figure 11:
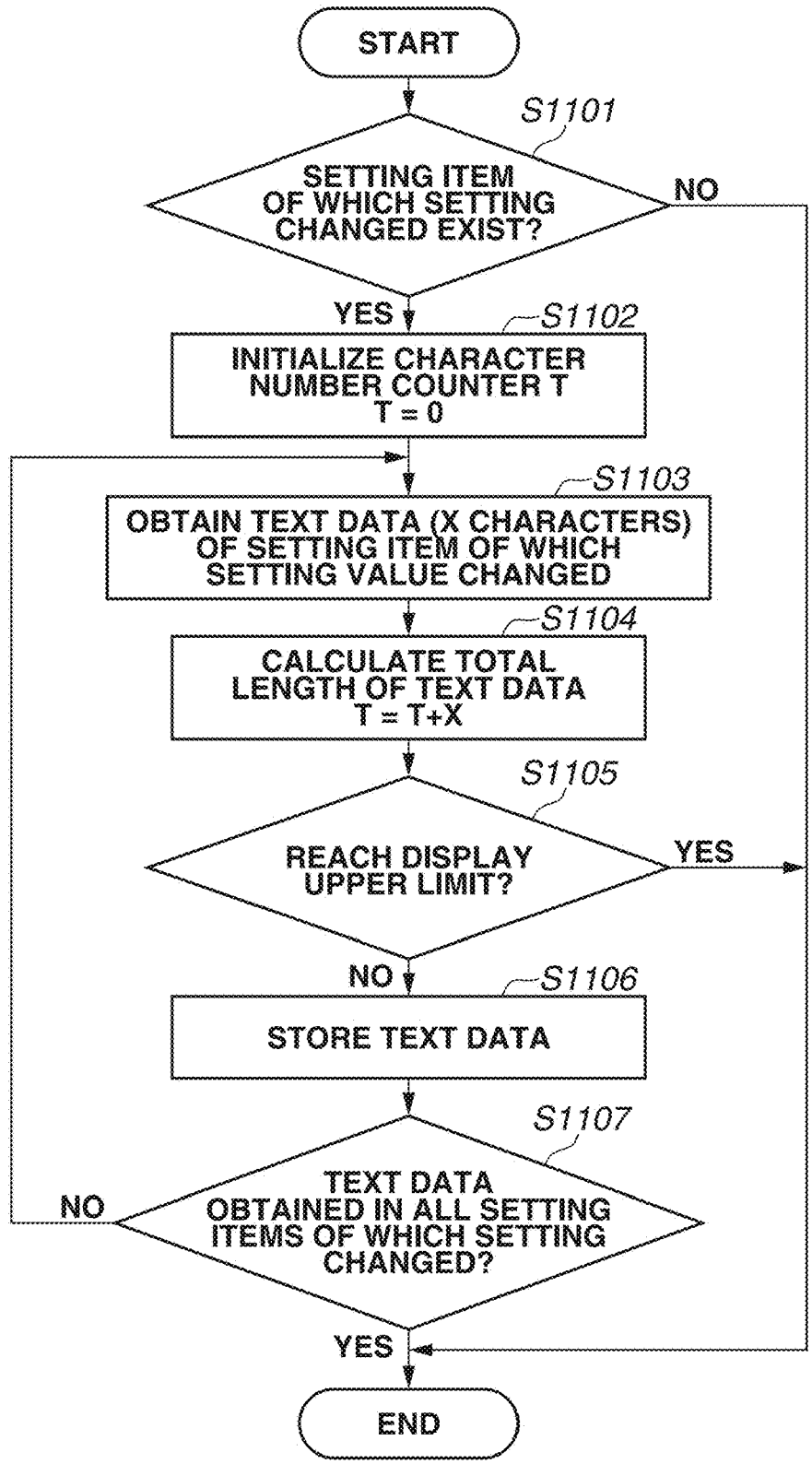
FIG. 11 is a flowchart illustrating processing for generating a text of a setting value displayed in a setting history of the integrated history according to a first exemplary embodiment.

FIG. 11 is a flowchart illustrating processing that the CPU 100 generates a text of the setting value in step S903 in FIG. 9. The processing described in FIG. 11 is realized by the CPU 100 executing a program stored in the HDD 103 or the ROM 104.

First, in step S1101, the CPU 100 compares the current setting 803 with the default setting 802 in the copy data table 800 stored in the HDD 103 and determines whether there is a setting item of which a setting value is changed. As a result of the comparison, when the setting value is changed in one or more setting items, the CPU 100 determines that there is the setting item of which the setting is changed from the default setting. When the setting value is not changed from the default setting (NO in step S1101), the CPU 100 terminates the processing described in the present flowchart.

When there is the setting item of which the setting value is changed from the default setting (YES in step S1101), in step S1102, the CPU 100 initializes a character number counter T for counting the number of characters in the text data of the setting value to zero.

In step S1103, the CPU 100 obtains the text data (X characters) of the leftmost setting item in the copy data table 800 among the setting items of which the setting value is changed from the copy data table 800. In the current case, the number of copies is different, and thus the CPU 100 obtains the text data of "2 copies".

Next, in step S1104, the CPU 100 calculates a length of an entire text data obtained so far from the copy data table 800. The CPU 100 executes processing for adding the number of characters X of the text data obtained in step S1103 to a current value of the character number counter T.

In step S1105, the CPU 100 determines whether the character number counter T calculated in step S1104 reaches an upper limit of a predetermined displayable text length. A range size for displaying a single setting history is limited in the integrated history 509. Thus, a text length which can be displayed in the single setting history is limited, and in step S1105, the CPU 100 determines whether a length of the obtained text data exceeds a display range.

In step S1105, when it is determined that the length of the obtained text data exceeds the display upper limit (YES in step S1105), the CPU 100 discards the obtained text data of the setting item of which the text data is obtained the last and terminates the processing in the present flowchart.

In step S1105, when the character number counter T does not reach the upper limit of the displayable characters (NO in step S1105), in step S1106, the CPU 100 stores the text data obtained in step S1103 as the text data of the setting value to be displayed in the integrated history 509.

In step S1107, the CPU 100 determines whether the setting item of which the setting value is changed from the default setting is remained. When the setting item of which the setting value is changed is remained (NO in step S1107), the CPU 100 repeats the processing in step S1103 to S1107. At that time, in step S1103, the CPU 100 obtains the text data of the leftmost setting item in the copy data table 800 among the setting items of which the text data is not yet obtained. When the processing is performed on all of the setting items of which the setting value is changed from the default setting (YES in step S1107), the CPU 100 terminates the processing described in the present flowchart. In the copy data table 800 in FIG. 8A, up to "2 copies, color, two-sided" is generated as the text data.

In FIG. 11, when the number of the setting items of which the setting is changed is large and it is impossible to display all of the changed setting items in the setting history, the setting item which exceeds the number of characters displayable in the setting history is not displayed. However, when the changed setting value is not displayed in the all setting items, an indicator such as " . . . " may be added to the end of the text indicating the setting value of the setting history. Alternatively, not an indicator but a character string of "others" may be displayed to show that there is the setting item of which setting is changed other than the displayed setting items.

Figure 12:
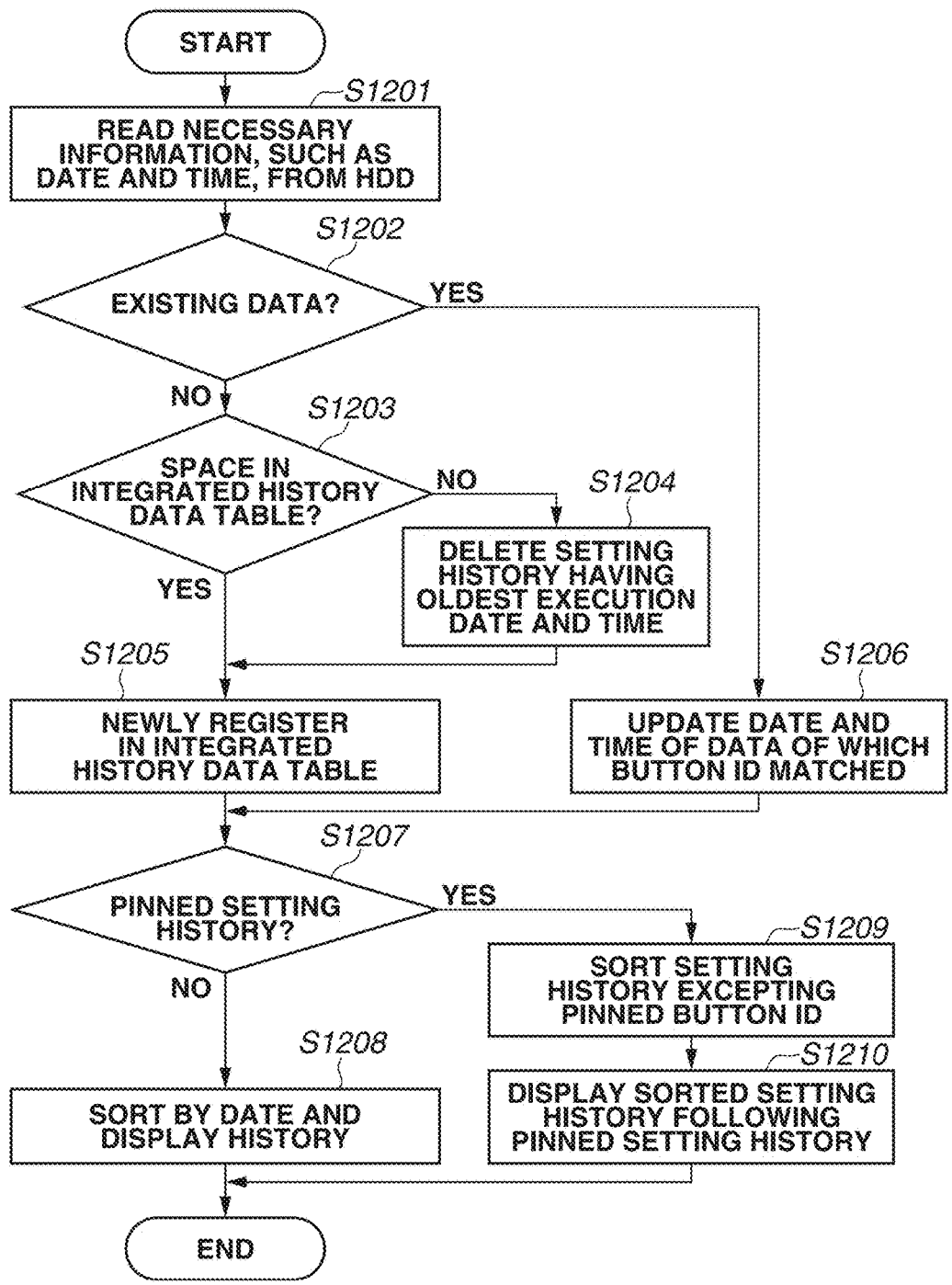
FIG. 12 is a flowchart illustrating processing for displaying a setting history on a home screen according to the present exemplary embodiment.

FIG. 12 is a flowchart illustrating processing until the image processing apparatus 1 displays the current setting in the integrated history 509 as the setting history. The processing described in FIG. 12 is realized by the CPU 100 executing a program stored in the HDD 103 or the ROM 104. The processing described in FIG. 12 is executed by the CPU 100 when the home screen is displayed on the touch panel 200 after a user executes a job.

In step S1201, the CPU 100 reads the information stored in the HDD 103 in step S904 or step S906 in FIG. 9.

Next, in step S1202, the CPU 100 checks the flag indicating existence or non-existence of the existing data of the data read in step S1201. When there is no existing data (NO in step S1202), in step S1203, the CPU 100 determines whether there is any empty space in the integrated history data table 1000. When the integrated history data table has an empty space (YES in step S1203), the CPU 100 executes processing in step S1205 described below.

When the integrated history data table does not have an empty space (NO in step S1203), in step S1204, the CPU 100 deletes the setting history including the oldest executed date and time in the setting histories which are not pinned from the integrated history data table 1000. In step S1204, the CPU 100 refers to the data table 1500 and obtains the setting history of the button ID in which the pinning is set to OFF from the setting history data table. The CPU 100 identifies the setting history including the oldest date and time of the job from the displayed texts of the obtained setting histories and deletes the relevant setting history from the integrated history data table 1000.

Subsequently, in step S1205, the CPU 100 registers the information read in step S1201 in the integrated history data table 1000. In step S1205, the CPU 100 assigns the button ID when registering the information regarding the setting history in the integrated history data table 1000. FIG. 10B illustrates a data table after the data read from the HDD 103 is added to the integrated history data table 1000.

When there is the existing data in step S1202 (YES in step S1202), in step S1206, the CPU 100 identifies the button ID of the setting history including the setting same as that obtained in step S1201 from the integrated history data table 1000. Subsequently, the CPU 100 updates the text data indicating the job execution date and time of the setting history of the identified button ID.

After the processing in step S1205 or S1206, in step S1207, the CPU 100 reads the data table 1500 of the setting history and determines whether there is the setting history in which the pinning is set to ON.

When there is no setting history in which the pinning is set to ON (NO in step S1207), in step S1208, the CPU 100 sorts the setting histories stores in the integrated history data table 1000 by date and displays them on the touch panel 200.

In step S1207, when there is the pinned setting history in the data table 1500 (YES in step S1207), in step S1209, the CPU 100 sorts the setting histories except the pinned setting history by the executed date and time.

In step S1210, the CPU 100 displays the setting histories sorted in step S1207 following the pinned setting history on the touch panel 200. According to the present exemplary embodiment, when there is a plurality of the pinned setting histories, the CPU 100 display the setting histories in descending order of the date and time when pinning is set. When pinning is set to a plurality of the setting histories, the arrangement order of the pinned setting histories is not limited to the above-described one. For example, a user may set a display order of the pinned setting histories. In addition, the pinned setting histories may be arranged in the execution order of jobs.

Next, processing for calling the setting from the setting history displayed in the integrated history 509 is described. For example, it is assumed that the home screen illustrated in FIG. 5B is displayed on the touch panel 200. At that time, the CPU 100 displays the "copy" screen 700 illustrated in FIG. 7B on the touch panel 200 in response to detecting a tap on the setting history 510. A tap is an operation that a user presses the touch panel 200 and finishes pressing before a predetermined time elapses. In response to the tap on the setting history displayed in the integrated history 509, a setting screen of the job to which the setting value associated with the tapped setting history is set is displayed on the touch panel 200.

Figure 13:
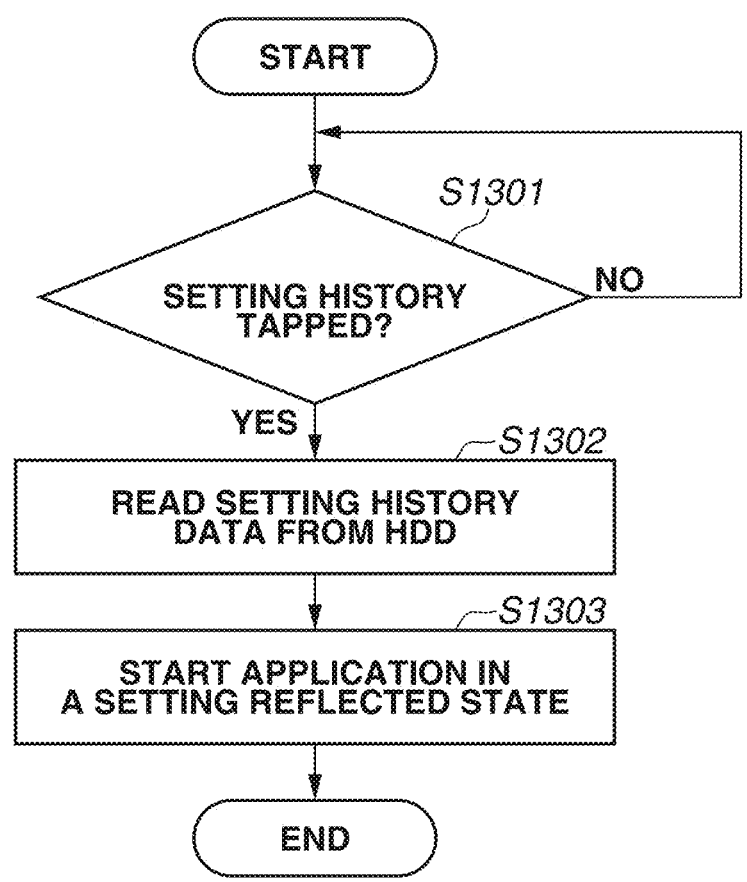
FIG. 13 is a flowchart illustrating processing for starting up an application from the integrated history according to the present exemplary embodiment.

Processing for calling the setting from the setting history displayed in the integrated history 509 is described with reference to FIG. 13. The processing described in FIG. 13 is realized by the CPU 100 executing a program stored in the HDD 103 or the ROM 104. FIG. 13 is a flowchart illustrating processing for calling an application from the integrated history 509.

In step S1301, the CPU 100 determines whether the setting history displayed in the integrated history 509 is pressed. The CPU 100 performs the processing in step S1301 until receiving a tap on the setting history.

In step S1301, when a tap on the setting history is detected (YES in step S1301), in step S1302, the CPU 100 reads the setting of the setting history associated with the button ID of the button on a tapped position from the HDD 103.

In step S1303, the CPU 100 displays a setting screen of the job to which the setting read in step S1302 is reflected on the touch panel 200 and terminates the processing described in the present flowchart.

The processing described in FIG. 13 is executed, and thus a user can call the setting once set in a single operation and is not required to performing setting again when using the setting same as that of the job executed in the past. In addition, when the user wants to execute a job by slightly changing the setting from the job executed in the past, the user can reduce the effort of setting by reading the past setting from the setting history compared with a case when performing setting from the default setting.

Figure 15A:
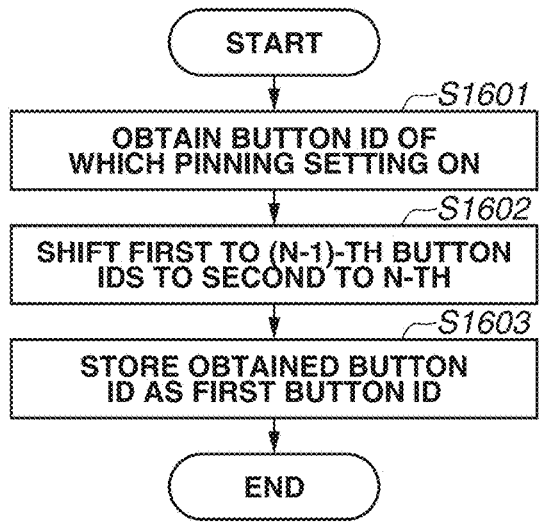
FIGS. 15A and 15B are flowcharts illustrating processing when pinning is set to and when the setting of pinning is released from a setting history displayed in the integrated history according to the present exemplary embodiment.
Figure 15B:
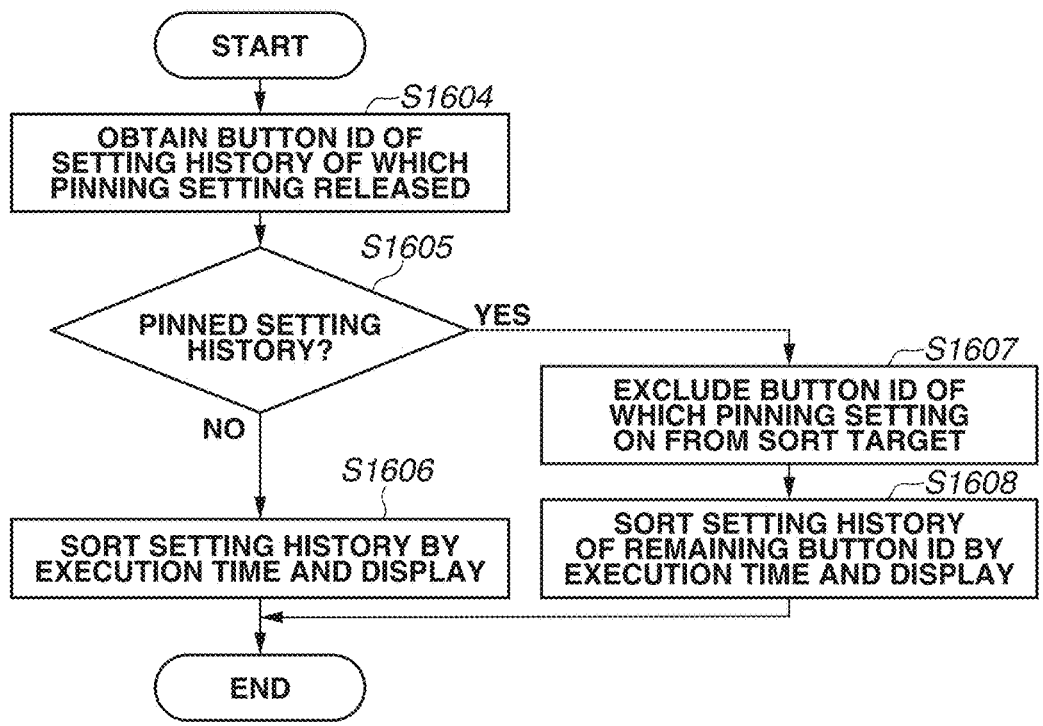

Next, pinning in the integrated history 509 is described with reference to FIGS. 15A and 15B.

As illustrated in FIG. 5F, when a user performs a long press on the setting history, the context menu 517 for setting regarding the setting history is displayed. The log press is described as an example of a user operation for displaying the context menu 517, however, a double-tap and an arrangement of a calling button may be used as a method for calling the context menu 517 without being limited to the long press.

Processing for setting pinning on the setting history displayed in the integrated history 509 by a user is described with reference to FIG. 15A. The processing described in FIG. 15A is realized by the CPU 100 executing a program stored in the HDD 103 or the ROM 104. The processing described in the flowchart in FIG. 15A is started when the CPU 100 detects pressing on the "pin" button 518 in the context menu 517. A case is described here as an example in which the pinning setting is set to ON in the setting history displayed in an N-th position in the integrated history 509.

In step S1601, the CPU 100 obtains the button ID of the setting history in which the pinning setting is set to ON.

In step S1602, the CPU 100 changes the button IDs and the pinning flags which are currently stored in first to (N−1)-th positions in the data table 1500 to second to N-th positions.

Lastly, in step S1603, the CPU 100 stores the button ID obtained in step S1601 in the first position of the data table 1500, turns the relevant pinning flag ON, and terminates the processing in the present flowchart.

When a user turns the pinning setting ON in the setting history displayed on the top of the integrated history 509, the CPU 100 sets ON to the pinning flag of the button ID of which the order in the data table 1500 is "1" and terminates the processing.

Processing for releasing the pinning setting from the pinned setting history according to the present exemplary embodiment is described with reference to FIG. 15B. The processing described in FIG. 15B is realized by the CPU 100 executing a program stored in the HDD 103 or the ROM 104. The processing described in FIG. 15B is started when the CPU 100 detects pressing on the "release pinning" button 522 in the context menu 517 illustrated in FIG. 5H.

In step S1604, the CPU 100 obtains the button ID of the setting history of which the pinning setting is released from the data table 1500. For example, when the "release pinning" button 522 is pressed in the screen illustrated in FIG. 5H, the CPU 100 obtains the button ID "1002" corresponding to the setting history 514 from the data table 1500. Further, the CPU 100 sets the pinning flag to OFF in the setting history of the button ID 1002 in the data table 1500.

Subsequently, in step S1605, the CPU 100 determines whether the data table 1500 includes the setting history of which the pinning flag is set to ON.

When there is no setting history of which the pinning flag is set to ON (NO in step S1605), in step S1606, the CPU 100 sorts the setting histories of the button IDs registered in the data table 1500 in the order of the job execution time and displays them on the touch panel 200.

When the data table 1500 includes the setting history of which the pinning flag is set to ON (YES in step S1605), in step S1607, the CPU 100 executes processing for excluding the relevant setting history from the sort. Subsequently, in step S1608, the CPU 100 sorts the remaining setting histories in the order of the job execution time and displays them on the touch panel 200 following the setting history of which the pinning flag is set to ON.

Operations and processing for registering the setting history displayed in the integrated history 509 in the custom button are described with reference to FIGS. 17, 18A and 18B.

The custom button data table 1900 for managing the custom button is described with reference to FIGS. 18A and 18B. The custom button data table 1900 includes a button ID, an application ID, data, a name, and a comment. The button ID is an ID for identifying the custom button, and the CPU 100 assigns a button ID when newly registering a custom button so as not to duplicate the button ID of the other custom button. The application ID and the data are the same as those described in the integrated history data table 1000 illustrated in FIGS. 10A to 10E. The name and comment are the text data displayed on the custom button. The name and comment are texts set in the name and comment registration screen 1701 illustrated in FIG. 16B and describe what kind of button the custom button is and which situation the button is used, and the like. The custom button data table 1900 is stored in the HDD 103 and read by the CPU 100 via the RAM 102.

FIG. 17 is a flow of processing for registering the setting history displayed in the integrated history 509 as the custom button. The processing is started when the CPU 100 detects pressing on the "register in menu" button 519. The present processing is realized by the CPU 100 executing a program stored in the HDD 103 or the ROM 104.

In step S1801, the CPU 100 specifies the button ID of the selected setting history and obtains necessary information such as the application ID and the data from the integrated history data table 1000. For example, when registering the setting history 514 in the custom button in FIG. 16A, the CPU 100 obtains the application ID "101" and data "data1.xml" from the integrated history data table 1000 in FIG. 10E.

In step S1802, the CPU 100 registers the data and information obtained in step S1801 in the custom button data table 1900 stored in the HDD 103. The custom button data table 1900 illustrated in FIG. 18A is the custom button data table 1900 after the processing in step S1802 is completed. The CPU 100 sets the button ID as "1903" and registers the application ID "101" and the data "data1.xml" in the relevant data table. The name and comment of the custom button are information not existing in the integrated history, so that they are not yet registered in the table.

Next, in step S1803, the CPU 100 displays the name and comment registration screen 1701 of the custom button on the touch panel 200. The CPU 100 detects pressing on the "OK" button 1704 on the name and comment registration screen 1701 and then registers the name and the comment in the custom button data table 1900. FIG. 18B illustrates the custom button data table 1900 after the name "for regular" and the comment "5 copies, color, two-sided" are registered.

In step S1805, the CPU 100 determines whether the pinning setting corresponding to the button ID of the selected setting history is ON. The CPU 100 refers to the data table 1500 and determines whether the pinning setting is ON in the selected setting history. When the pinning setting is OFF in the selected setting history (NO in step S1805), the CPU 100 executes the processing in step S1807 which is described below.

When the pinning setting is ON in the selected setting history (YES in step S1805), in step S1806, the CPU 100 sets the pinning setting to OFF in the relevant setting history in the data table 1500.

In step S1807, the CPU 100 displays the integrated history 509 in which the setting histories registered in the integrated history data table 1000 are sorted in the job execution order and the menu 500 on the touch panel 200. More specifically, the CPU 100 executes the processing described in step S1207 to S1210 in FIG. 12.

According to the present exemplary embodiment, the CPU 100 sets the pinning setting of the setting history registered in the custom button to OFF. In step S1806, the CPU 100 can display a pinning state change confirmation screen 1740 illustrated in FIG. 16D on the touch panel 200 and enable a user to select whether to release the pinning. According to this configuration, the CPU 100 can check with a user whether to release the pinning when registering in the custom button. Accordingly, the pinning setting of the setting history that a user does not want to release the pinning setting can be prevented from being released.

Lastly, processing for reading the job setting registered in the custom button from the home screen and performing setting thereon is described. In response to detecting pressing on the custom button displayed on the home screen, the CPU 100 identifies the button ID of the pressed custom button. The CPU 100 reads the data of the button ID of the pressed custom button from the custom button data table 1900. For example, the button ID of the pressed custom button is "1903", the CPU 100 reads data "data3.xml". The CPU 100 displays the setting screen of the job to which the read setting value is set on the touch panel 200. The setting history is registered in the custom button, and thus a user can reads the setting of the relevant job from the home screen and perform setting thereon even if the relevant setting history is not displayed in the integrated history 509.

As described above, according to the present exemplary embodiment, a custom button registered in response to a registration instruction by a user and a setting history generated according to execution of a job are displayed. Further, in response to selection of the setting history, a user can input an instruction to register a setting of the job which can be set by the relevant setting history to the custom button. Accordingly, when the setting of the job which can be set by the setting history is registered in the custom button, the setting of the job can be registered in the custom button without performing the setting of the relevant job. Accordingly, a user can reduce the effort of registering the setting of the job which can be set by the relevant setting history in the custom button.

Further, according to the present exemplary embodiment, when the pinned history in the integrated history 509 is registered in the custom button, the pinning setting is automatically turned OFF. A user who registers the custom button from the setting history is expected to use the generated custom button instead of the integrated history 509. Thus, the pinning setting set to the relevant setting history becomes unnecessary, and the user is highly likely to release the pinning setting. According to the present exemplary embodiment, after the pinned history is registered in the custom button, the pinning setting is set to OFF without the necessity of performing an operation to release the pinning by the user himself/herself, so that the convenience is improved.

According to the first exemplary embodiment, the method is described in which when the pinned setting history is registered in the custom button, the pinning setting set to the relevant setting history is turned OFF. According to the first exemplary embodiment, the relevant setting history is displayed in the integrated history 509 after a user registers the setting history in the custom button.

On the other hand, in the case that the setting history displayed in the integrated history 509 is registered in the custom button, a user is highly likely to use the custom button in the next and subsequent times, and it is less likely that the setting is read from the pinned setting history displayed in the integrated history 509. Thus, according to a second exemplary embodiment, a case is described in which when the setting history displayed in the integrated history 509 is registered in the custom button, the relevant pinned setting history is controlled not to be displayed in the integrated history. The descriptions of the configuration and processing which are the same as those according to the first exemplary embodiment are omitted, and only different points are described below.

Processing and display when the setting history displayed in the integrated history 509 is registered in the custom button are described with reference to FIGS. 19, 20A, and 20B.

FIG. 19 is a flowchart illustrating processing for registering the history in the integrated history 509 in the custom button, and the processing is started when pressing on the "register in menu" button 519 is detected. The present processing is realized by the CPU 100 executing a program stored in the HDD 103 or the ROM 104. In the present flow, the processing in step S1806 in FIG. 17 is replaced with processing in step S2101.

When the pinning flag of the setting history registered in the custom button is ON (YES in step S1805), in step S2101, the CPU 100 deletes the relevant setting history from the integrated history data table 1000.

When the pinning flag of the selected setting history is OFF (NO in step S1805), the CPU 100 executes the processing in step S1807.

Figure 20A:
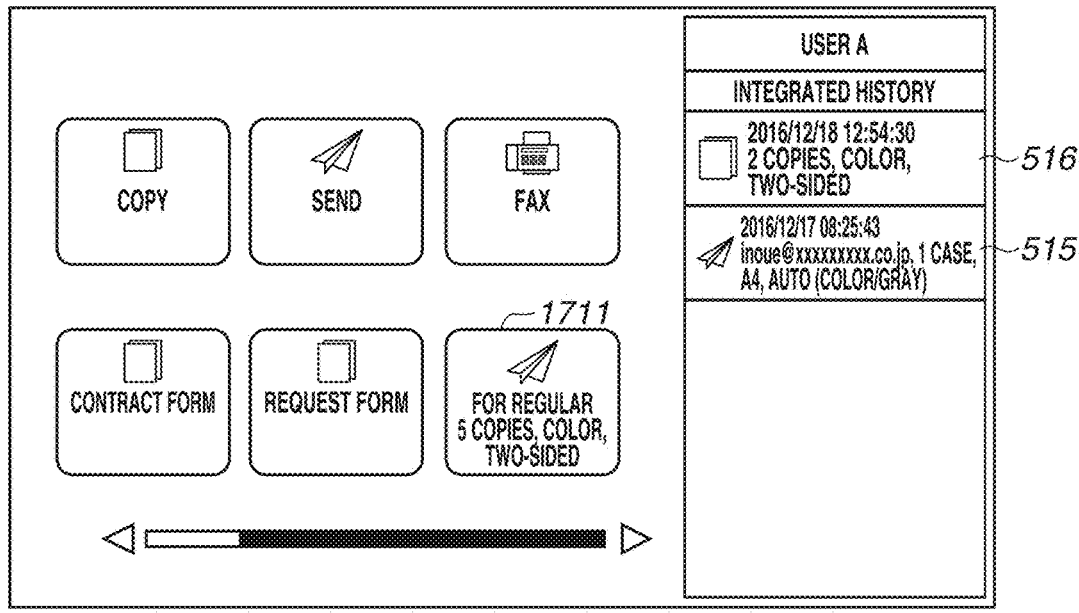
FIGS. 20A and 20B illustrate examples of screens displayed when a setting history displayed in the integrated history is registered in a custom menu according to the second exemplary embodiment.

When the pinned setting history is registered in the custom button as illustrated in FIG. 16A, a screen illustrated in FIG. 20A is displayed on the touch panel 200. In FIG. 20A, the setting history 514 displayed in the integrated history 509 is not displayed, and the custom button 1711 is displayed instead through which the setting same as that of the setting history 514 can be read and set.

Figure 20B:
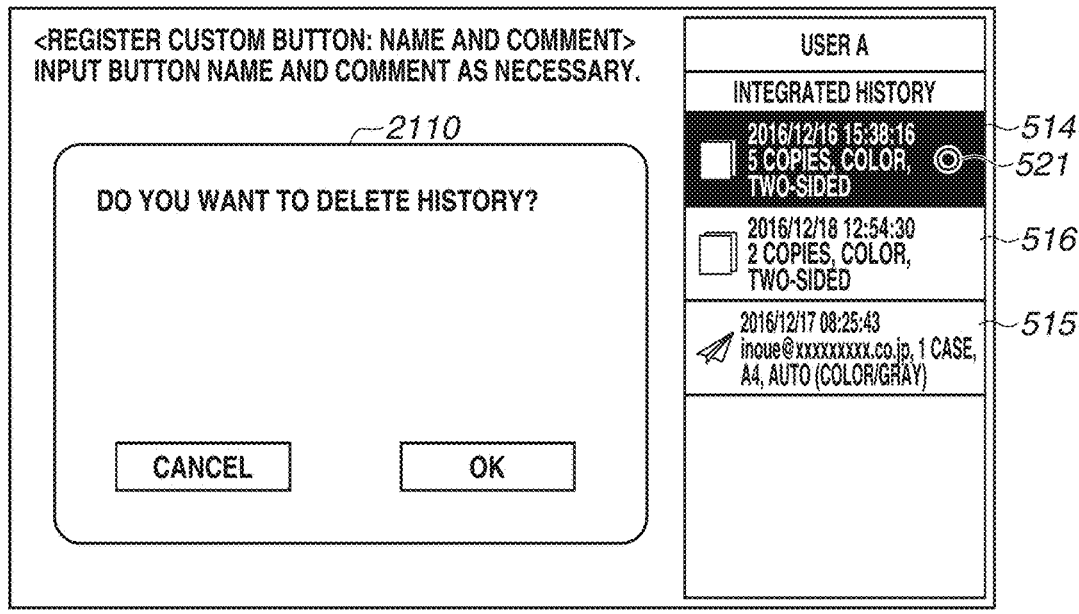

According to the present exemplary embodiment, the CPU 100 deletes data associated with the button ID of the history from the data table in step S2101, however, a history deletion confirmation screen 2110 illustrated in FIG. 20B is displayed to enable a user to select whether to delete the history. When detecting pressing on an "OK" button on the history deletion confirmation screen 2110, the CPU 100 executes the processing in step S2101. Accordingly, the setting history which a user does not want to hide can be displayed in the integrated history 509.

According to the present exemplary embodiment, the method for controlling, when the pinned setting history is set to the custom button, not to display the selected setting history in the integrated history 509 is described. However, when the custom button is registered from the setting history displayed in the integrated history 509, the CPU 100 can perform control not to display the setting history in the integrated history 509 regardless of the pinning setting. In this case, the CPU 100 executes the processing described in step S2101 without executing the processing in step S1805 in the processing illustrated in FIG. 19.

As described above, according to the second exemplary embodiment, when the pinned setting history displayed in the integrated history 509 is registered in the custom button, the control is performed not to display the relevant setting history in the integrated history 509. According to the present exemplary embodiment, a user is not required to perform an operation for deleting the history after registering the pinned setting history in the custom button, so that the user can reduce the effort of performing operations, and the convenience is improved.

According to the first and the second exemplary embodiments, when the setting history is registered in the custom button, a user inputs a comment to be displayed in the custom button. The name and comment registration screen 1701 can be displayed in which the date and time and the setting value displayed in the setting history is preliminarily input in the comment input area 1703. In this case, in step S1801, the CPU 100 obtains the text data that indicates the date and time and the setting value of the displayed text in the integrated history data table 1000. In step S1802, the CPU 100 displays the relevant text data in the comment input area 1703 of the name and comment registration screen 1701.

According to the first and the second exemplary embodiments, the CPU 100 detects pressing on the custom button and displays the job setting screen to which the setting stored in the custom button data table 1900 in association with the custom button is reflected. The CPU 100 can detect pressing on the custom button and execute a job using the job setting stored in association with the custom button. Accordingly, a user can execute a job by just pressing the custom button displayed on the home screen.

According to the first and the second exemplary embodiments, in response to a tap on the setting history, the job setting screen to which the relevant setting history is reflected is displayed, and the context menu is displayed in response to a long press on the setting history. However, the image processing apparatus 1 can display the context menu 517 by detecting a tap on the setting history. At that time, a "call setting" button, which is not illustrated, is displayed on the context menu 517, and thus a user can select whether to call and set the selected setting history or to register the selected setting history in the menu as the custom button via the context menu.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-016095, filed Jan. 31, 2017, which is hereby incorporated by reference herein in its entirety.

What is claimed is:

1. An image processing apparatus having a plurality of applications for using functions of the image processing apparatus which arranges, in a first area displayed on an operation unit of the image processing apparatus, a first software key for executing an application among the plurality of applications, the image processing apparatus comprising:

at least one memory storing instructions; and
at least one processor that, upon execution of the instructions, configures the at least one processor to
display, on the operation unit, a second area where a second software key generated by executing a job corresponding to the application is arranged, wherein the second software key is for re-executing the application by a first user operation according to a setting content of the executed job; and
display, on the operation unit, an item for arranging, in the first area, the first software key for executing a job according to a setting content of the second software key, and a menu screen including the item when the second software key is selected by a second user operation different from the first user operation.

2. The image processing apparatus according to claim 1, wherein, execution of the stored instructions further configures the at least one processor to, in response continuous selection of the second software key for a predetermined time length, perform control to display the menu screen for registering the job setting set by the continuously selected second software key as custom job setting set by the item.

3. The image processing apparatus according to claim 1, wherein, execution of the stored instructions further configures the at least one processor to, in response to detection that selection and completion of the selection of the second software key occurs before the predetermined time length elapses, perform control to display a setting screen of a job to which the job setting set by the second software key is reflected.

4. The image processing apparatus according to claim 1, wherein execution of the stored instructions further configures the at least one processor to perform control to store custom job setting set by the item in association with a type of job.

5. The image processing apparatus according to claim 1, wherein, execution of the stored instructions further configures the at least one processor to, in response to execution of a job, perform control to store a type and a setting of the executed job.

6. The image processing apparatus according to claim 1, wherein, execution of the stored instructions further configures the at least one processor to, in response to detection of selection of the item perform control to display a setting screen of a job to which the custom job setting set by the selected item is reflected.

7. The image processing apparatus according to claim 1, wherein, execution of the stored instructions further configures the at least one processor to, in response to detection of selection of the item, perform control to execute a job by reflecting the job setting set by the selected item.

8. The image processing apparatus according to claim 1, further comprising:

a storage configured to store a predetermined number of job settings,
- wherein the operation unit displays the second software key for setting a stored job setting as a setting for a new job, and
- wherein, in a case where the storage stores the predetermined number of job settings, execution of the stored instructions further configures the at least one processor to, in response to execution of a job, perform control to delete one of the stored job settings and store a setting of the executed job.

9. The image processing apparatus according to claim 8, wherein execution of the stored instructions further configures the at least one processor to, perform a setting so that the job setting set by the second software key selected by a user is not deleted from the storage.

10. The image processing apparatus according to claim 9, wherein, execution of the stored instructions further configures the at least one processor to, in response to the job setting set by the second software key on which the setting is performed being registered as a custom job setting set by the item, perform control to release the setting.

11. The image processing apparatus according to claim 9, wherein, execution of the stored instructions further configures the at least one processor to, in response to the job setting set by the second software key selected being registered as the custom job setting set by the item, perform control to display a screen for selecting whether to release the setting set to the second software key.

12. The image processing apparatus according to claim 1, wherein, execution of the stored instructions further configures the at least one processor to, in response to the job setting set by the second software key being registered as the custom job setting set by the item, perform control not to display the selected second software key.

13. The image processing apparatus according to claim 1, wherein, execution of the stored instructions further configures the at least one processor to, in response to the job setting set by the second software key being registered as the custom job setting set by the item, display a screen for selecting whether to display the selected second software key.

14. The image processing apparatus according to claim 1, wherein the job is one or more of a copy job, a scan job, a facsimile job, a print job, and a transmission job via a network.

15. The image processing apparatus according to claim 1, wherein the operation unit displays buttons regarding a plurality of types of jobs in a list.

16. A method for controlling an image processing apparatus having a plurality of applications for using functions of the image processing apparatus which arranges, in a first area displayed on an operation unit of the image processing apparatus, a first software key for executing an application among the plurality of applications, the method comprising:
- displaying a second area where a second software key generated by executing a job corresponding to the application is arranged, wherein the second software key is for re-executing the application by a first user operation according to a setting content of the executed job, and
- displaying an item for arranging, in the first area, the first software key for executing a job according to a setting content of the second software key, and a menu screen including the item when the second software key is selected by a second user operation different from the first user operation.

17. A non-transitory computer readable storage medium storing a program for causing an image processing apparatus having a plurality of applications for using functions of the image processing apparatus which arranges, in a first area displayed on an operation unit of the image processing apparatus, a first software key for executing an application among the plurality of applications to execute a
- displaying a second area where a second software key generated by executing a job corresponding to the application is arranged, wherein the second software key is for re-executing the application by a first user operation according to a setting content of the executed job, and
- displaying an item for arranging, in the first area, the first software key for executing a job according to a setting content of the second software key, and a menu screen including the item when the second software key is selected by a second user operation different from the first user operation.

* * * * *